US012782862B2

(12) United States Patent
Komatsu et al.

(10) Patent No.: US 12,782,862 B2
(45) Date of Patent: Nov. 3, 2026

(54) FOREIGN SUBSTANCE COLLECTION APPARATUS, PROCESS CARTRIDGE, AND IMAGE FORMING APPARATUS

(71) Applicant: CANON KABUSHIKI KAISHA, Tokyo (JP)

(72) Inventors: Noriyuki Komatsu, Shizuoka (JP); Tomonori Mori, Kanagawa (JP); Teruhiko Sasaki, Shizuoka (JP); Makoto Hayashida, Shizuoka (JP); Shunsuke Uratani, Shizuoka (JP); Yuuki Nakamura, Shizuoka (JP); Satoru Motohashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/891,033

(22) Filed: Sep. 20, 2024

(65) Prior Publication Data

US 2025/0013184 A1 Jan. 9, 2025

Related U.S. Application Data

(63) Continuation of application No. 18/500,438, filed on Nov. 2, 2023, now Pat. No. 12,124,205, which is a
(Continued)

(30) Foreign Application Priority Data

Dec. 25, 2019 (JP) ................................ 2019-234917
Nov. 9, 2020 (JP) ................................ 2020-186429

(51) Int. Cl.
*G03G 21/00* (2006.01)
*G03G 21/12* (2006.01)
(Continued)

(52) U.S. Cl.
CPC ..... *G03G 21/0058* (2013.01); *G03G 21/0011* (2013.01); *G03G 21/12* (2013.01);
(Continued)

(58) Field of Classification Search
CPC ........... G03G 21/0058; G03G 21/0011; G03G 21/12; G03G 21/169; G03G 21/1814;
(Continued)

(56) References Cited

U.S. PATENT DOCUMENTS 7,756,462 B2 7/2010 Iwasaki
9,201,378 B2 12/2015 Asaoka
(Continued)

FOREIGN PATENT DOCUMENTS

JP H02281268 A 11/1990
JP 2003295720 A 10/2003
(Continued)

OTHER PUBLICATIONS

Office Action issued in U.S. Appl. No. 17/128,548, mailed Jul. 6, 2021.
(Continued)

*Primary Examiner* — Joseph S Wong
(74) *Attorney, Agent, or Firm* — ROSSI, KIMMS & McDOWELL LLP

(57) ABSTRACT

A foreign substance collection apparatus includes: a frame body; a photosensitive drum; a cleaning roller which collects foreign substances from a surface of the photosensitive drum; a collecting roller which further collects the foreign substances having been collected by the cleaning roller from the cleaning roller; and a scraping member which scrapes off the foreign substances from the collecting roller. A foreign substance collecting portion included in the frame body has, in a posture during use: a first inner bottom surface which is positioned below the scraping member in a gravity direction;
(Continued)

an outer bottom surface which is positioned further below the first inner bottom surface; and a connecting surface which intersects the first inner bottom surface and the outer bottom surface and which connects the first inner bottom surface and the outer bottom surface with each other.

4 Claims, 26 Drawing Sheets

Related U.S. Application Data continuation of application No. 17/703,511, filed on Mar. 24, 2022, now Pat. No. 11,841,668, which is a continuation of application No. 17/128,548, filed on Dec. 21, 2020, now Pat. No. 11,314,193.

(51) Int. Cl.
*G03G 21/16* (2006.01)
*G03G 21/18* (2006.01)

(52) U.S. Cl.
CPC ....... *G03G 21/169* (2013.01); *G03G 21/1814* (2013.01); *G03G 2221/0026* (2013.01); *G03G 2221/0047* (2013.01); *G03G 2221/0089* (2013.01)

(58) Field of Classification Search
CPC ... G03G 2221/0026; G03G 2221/0047; G03G 2221/0089
See application file for complete search history.

(56) References Cited

U.S. PATENT DOCUMENTS

| | | | |
|---|---|---|---|
| 9,310,759 B2 | 4/2016 | Fukamachi | |
| 9,335,727 B2 | 5/2016 | Abe | |
| 9,823,621 B2 | 11/2017 | Miyamoto | |
| 9,829,851 B2 | 11/2017 | Okura | |
| 11,314,193 B2 * | 4/2022 | Komatsu | G03G 21/12 |
| 11,841,668 B2 | 12/2023 | Komatsu et al. | |
| 2009/0232559 A1 * | 9/2009 | Ushikubo | G03G 21/105 399/359 |
| 2013/0108322 A1 | 5/2013 | Nishimoto | |
| 2017/0269537 A1 | 9/2017 | Yamaguchi et al. | |
| 2018/0275543 A1 * | 9/2018 | Yoshihara | G03G 9/0827 |
| 2020/0209780 A1 | 7/2020 | Hamada et al. | |
| 2020/0409289 A1 | 12/2020 | Nakayashiki | |

FOREIGN PATENT DOCUMENTS

| | | |
|---|---|---|
| JP | 2005055771 A | 3/2005 |
| JP | 2005250407 A | 9/2005 |
| JP | 2006184751 A | 7/2006 |
| JP | 2006251492 A | 9/2006 |
| JP | 2006308629 A | 11/2006 |
| JP | 2008003146 A | 1/2008 |
| JP | 2013097151 A | 5/2013 |
| JP | 2016224221 A | 12/2016 |

OTHER PUBLICATIONS

Notice of Allowance issued in U.S. Appl. No. 17/128,548, mailed Dec. 27, 2021.
Quayle Action issued in U.S. Appl. No. 17/703,511, mailed Jun. 15, 2023.
Notice of Allowance issued in U.S. Appl. No. 17/703,511, mailed Sep. 1, 2023.
Office Action issued in U.S. Appl. No. 18/500,438, mailed May 17, 2024.
Notice of Allowance issued in U.S. Appl. No. 18/500,438, mailed Sep. 5, 2024.

* cited by examiner

FOREIGN SUBSTANCE COLLECTION APPARATUS, PROCESS CARTRIDGE, AND IMAGE FORMING APPARATUS

BACKGROUND OF THE INVENTION

Field of the Invention

The present invention relates to a cartridge such as a photosensitive unit or a developing unit which is mountable to or detachable from an image forming apparatus adopting an electrophotographic system.

Description of the Related Art

In a laser beam printer or a copier as an image forming apparatus adopting an electrophotographic system, an image is formed on a recording material by forming a toner image on a photosensitive drum and transferring the toner image onto a sheet as the recording material. In laser beam printers, in order to facilitate maintenance, a system is widely adopted in which a part of components of an image forming apparatus is provided in a cartridge and the cartridge is taken out from an apparatus main body to perform maintenance and replacement. Japanese Patent Application Laid-open No. 2016-224221 discloses a process cartridge in which a developing unit that houses toner is attachable to and detachable from a photosensitive unit that has a photosensitive drum.

SUMMARY OF THE INVENTION

With process cartridges structured such that a developing unit that houses toner is attachable to and detachable from a photosensitive unit that has a photosensitive drum, there is room for improvement in terms of size, cost, accuracy, usability, lifespan, and the like.

An object of the present invention is to provide a technique that enables a capability of a process cartridge to house foreign substances to be improved.

In order to achieve the object described above, a foreign substance collection apparatus according to the present invention includes:

a frame body;

an image bearing member which is rotatably supported by the frame body and which bears a developer image;

a first collecting member which is rotatably supported by the frame body and which collects foreign substances from a surface of the image bearing member by rotating in a state of being in contact with the surface of the image bearing member;

a second collecting member which is rotatably supported by the frame body and which further collects the foreign substances having been collected by the first collecting member from the first collecting member by rotating in a state of being in contact with a surface of the first collecting member; and a scraping member which is provided on the frame body so as to be capable of rubbing against the second collecting member that is rotating and which scrapes off the foreign substances from the second collecting member, wherein the frame body includes a housing portion which forms a housing space for housing foreign substances, wherein the housing portion includes, in a posture during use:

a first inner bottom surface which is positioned below the scraping member in a gravity direction;

a second inner bottom surface which is positioned further below the first inner bottom surface; and a connecting surface which intersects the first inner bottom surface and the second inner bottom surface and which connects the first inner bottom surface and the second inner bottom surface with each other.

In order to achieve the object described above, a foreign substance collection apparatus according to the present invention includes:

a frame body;

an image bearing member which is rotatably supported by the frame body and which bears a developer image;

a first collecting member which is rotatably supported by the frame body and which collects foreign substances from a surface of the image bearing member by rotating in a state of being in contact with the surface of the image bearing member;

a second collecting member which is rotatably supported by the frame body and which further collects the foreign substances having been collected by the first collecting member from the first collecting member by rotating in a state of being in contact with a surface of the first collecting member; and a scraping member which is provided on the frame body so as to be capable of rubbing against the second collecting member that is rotating and which scrapes off the foreign substances from the second collecting member, wherein the frame body includes:

a housing portion which forms a housing space for housing foreign substances; and a conveying member which conveys foreign substances inside the housing space.

In order to achieve the object described above, a foreign substance collection apparatus according to the present invention includes:

a frame body;

an image bearing member which is rotatably supported by the frame body and which bears a developer image;

a first collecting member which is rotatably supported by the frame body and which collects foreign substances from a surface of the image bearing member by rotating in a state of being in contact with the surface of the image bearing member;

a second collecting member which is rotatably supported by the frame body and which further collects the foreign substances having been collected by the first collecting member from the first collecting member by rotating in a state of being in contact with a surface of the first collecting member;

a scraping member which is provided on the frame body so as to be capable of rubbing against the second collecting member that is rotating and which scrapes off the foreign substances from the second collecting member; and a third collecting member which is capable of coming into contact with the second collecting member, wherein the third collecting member is controlled to come into contact with an outer circumferential surface of the second collecting member during a rotation operation in which the second collecting member rotates.

In order to achieve the object described above, a foreign substance collection apparatus according to the present invention includes:

a frame body;

an image bearing member which is rotatably supported by the frame body and which bears a developer image;

a first collecting member which is rotatably supported by the frame body and which collects foreign substances from a surface of the image bearing member by rotating in a state of being in contact with the surface of the image bearing member; and a second collecting member which is rotatably supported by the frame body and which further collects the foreign substances having been collected by the first collecting member from the first collecting member by rotating in a state of being in contact with a surface of the first collecting member, wherein the first collecting member and the second collecting member are rotationally driven so that, in a contact portion where the first collecting member and the second collecting member come into contact with each other, respective surfaces of the first collecting member and the second collecting member move in reverse directions.

In order to achieve the object described above, a foreign substance collection apparatus according to the present invention includes:

a frame body;

an image bearing member which is rotatably supported by the frame body and which bears a developer image;

a first collecting member which is rotatably supported by the frame body and which collects foreign substances from a surface of the image bearing member by rotating in a state of being in contact with the surface of the image bearing member;

a second collecting member which is rotatably supported by the frame body and which further collects the foreign substances having been collected by the first collecting member from the first collecting member by rotating in a state of being in contact with a surface of the first collecting member; and a scraping member which is provided on the frame body so as to be capable of rubbing against the second collecting member that is rotating and which scrapes off the foreign substances from the second collecting member, wherein the frame body includes a housing portion which forms a housing space for housing foreign substances, wherein the housing portion includes, in a posture during use:

a first side surface which is positioned below the frame body in a front-back direction;

a second side surface which is positioned further apart from the scraping member than the first side surface; and a connecting surface which intersects the first side surface and the second side surface and which connects the first side surface and the second side surface with each other.

According to the present invention, a capability of a process cartridge to house foreign substances can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
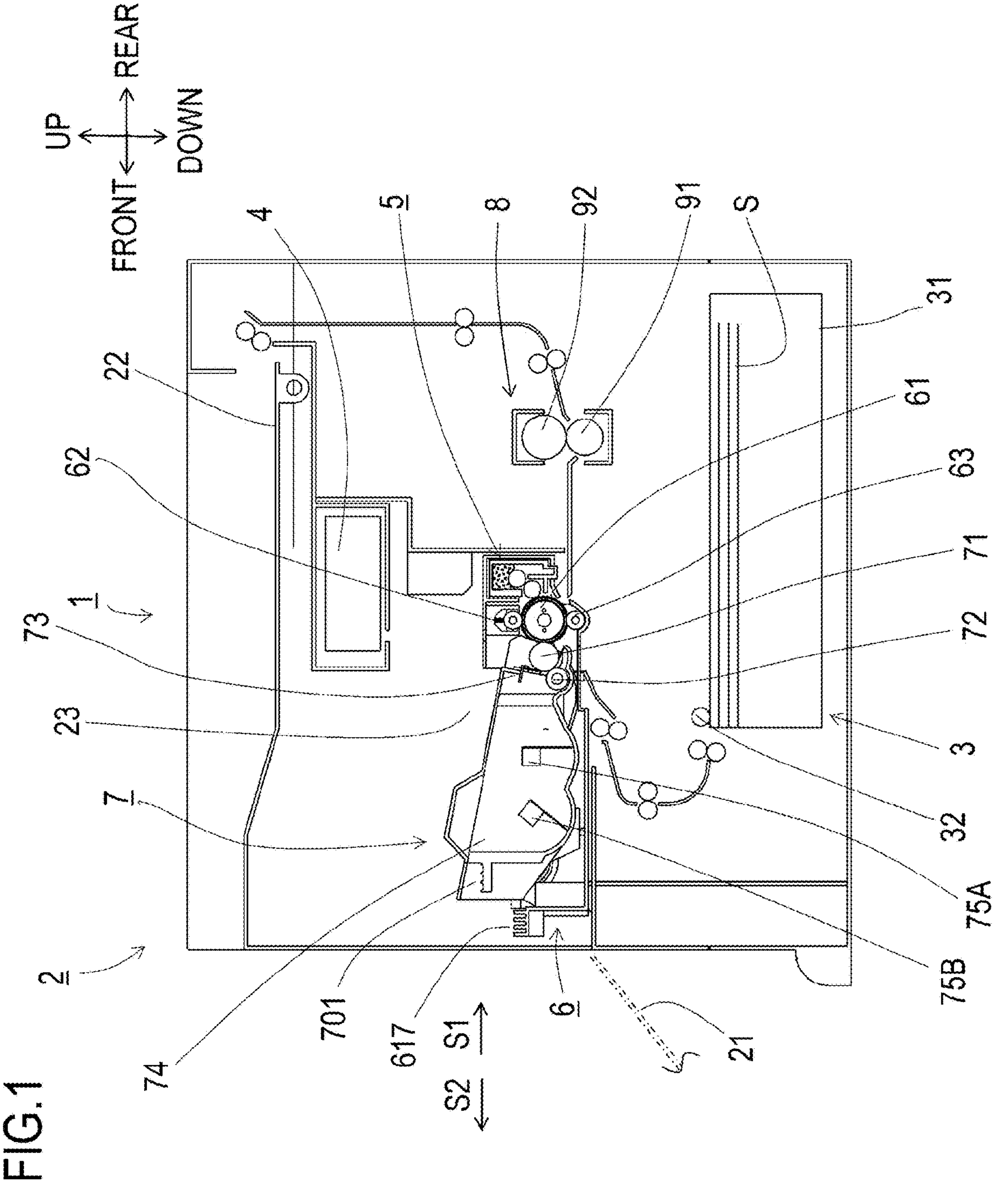
FIG. 1 is a sectional view of an image forming apparatus according to a first embodiment.

First, an image forming apparatus and a process cartridge according to a first embodiment of the present invention will be described in detail with reference to the drawings when appropriate. FIG. 1 is a sectional view of an image forming apparatus 1 that includes a process cartridge 5.

In the following description, directions based on a user who uses the image forming apparatus 1 are defined. Specifically, a front surface side of the image forming apparatus 1 is defined as “front”, a rear surface side is defined as “rear”, an upper surface (top surface) side is defined as “up”, and a lower surface (bottom surface) side is defined as “down”. In addition, a left side of the image forming apparatus 1 when the image forming apparatus 1 is viewed from the front surface side is defined as “left” and a right side is defined as “right”. Directions are also defined with respect to the process cartridge 5 in a similar manner to the image forming apparatus 1 on the assumption that the process cartridge 5 is in the same posture as in a state where the process cartridge 5 is mounted to the image forming apparatus 1. Each direction in each drawing is defined by an arrow depicted in the drawing.

A front-back direction, an up-down direction, and a left-right direction which are depicted by the arrows are directions that are perpendicular to each other. The directions indicate same directions in all of the drawings. The up-down direction is parallel to a vertical direction and the left-right direction and the front-back direction are parallel to a horizontal direction. In addition, the left-right direction is respectively parallel to a rotational axis direction of a photosensitive drum 61 as an image bearing member that bears a developer image and to a rotational axis direction of a developing roller 71. The front-back direction is perpendicular to both a longitudinal direction of the photosensitive drum 61 and gravity direction. Furthermore, a developing unit 7 being mounted to and integrated with a photosensitive unit 6 is referred to as the process cartridge 5. The process cartridge 5 is inserted in a direction of an arrow S1 in FIG. 1 (a mounting direction) when being mounted to an apparatus main body 2 and is detached in a direction of an arrow S2 in FIG. 1.

Overall Configuration of Image Forming Apparatus

FIG. 1 is a sectional view of the image forming apparatus 1 to which the process cartridge 5 has been mounted. As shown in FIG. 1, the image forming apparatus 1 mainly includes a paper feeding portion 3 for supplying a paper sheet S into the apparatus main body 2, an exposing apparatus 4, the process cartridge 5 for transferring a toner image onto the paper sheet S, and a fixing apparatus 8 for thermally fixing the toner image having been transferred onto the paper sheet S. The paper feeding portion 3 is provided in a lower part inside the apparatus main body 2 and mainly includes a paper feeding tray 31 and a paper feeding mechanism 32. The paper sheet S housed in the paper feeding tray 31 is supplied toward the process cartridge 5 (between the photosensitive drum 61 and a transfer roller 63) by the paper feeding mechanism 32.

The exposing apparatus 4 is arranged in an upper part inside the apparatus main body 2 and includes a laser light-emitting portion (not illustrated) and a polygonal mirror, a lens, a mirror reflector, and the like which are shown but are not assigned reference characters. With the exposing apparatus 4, laser light which is based on image data and which is emitted from the laser light-emitting portion scans a surface of the photosensitive drum 61 at high speed to expose the surface of the photosensitive drum 61.

The process cartridge 5 is arranged below the exposing apparatus 4. The process cartridge 5 is configured to be inserted in the direction of the arrow S1 into a housing portion 23 of the apparatus main body 2 from an opening that is created when opening (depicted by a two-dot chain line in FIG. 1) a door (an opening/closing member) 21 provided on the apparatus main body 2. When detaching the process cartridge 5 from the apparatus main body 2, the process cartridge 5 is detached by moving the process cartridge 5 in the direction of the arrow S2. In this manner, the process cartridge 5 is configured to be attachable to and detachable from the apparatus main body 2 of the image forming apparatus 1.

The process cartridge 5 mainly includes the photosensitive unit 6 and the developing unit 7. The photosensitive unit 6 mainly includes the photosensitive drum 61, a charging roller 62, and the transfer roller 63. The developing unit 7 is configured to be attachably and detachably mounted to and from the photosensitive unit 6. The developing unit 7 mainly includes the developing roller 71, a supplying roller 72, a layer thickness regulating blade 73, a toner housing portion (a developer housing portion) 74 that houses toner (a developer), and a first agitator 75A and a second agitator 75B provided inside the toner housing portion 74.

Image Forming Process

Next, an image forming process using the process cartridge 5 will be described. The photosensitive drum 61 is rotationally driven while the image forming process is being executed. First, a surface of the photosensitive drum 61 is uniformly charged by the charging roller 62 that is a charging member and, subsequently, as the surface of the photosensitive drum 61 is exposed by laser light which corresponds to image data and which is emitted from the exposing apparatus 4, an electrostatic latent image corresponding to the image data is formed on the photosensitive drum 61.

Meanwhile, after the toner inside the toner housing portion 74 is stirred by the second agitator 75B and the first agitator 75A, the toner is supplied to the developing roller 71 via the supplying roller 72. In addition, the toner supplied to the developing roller 71 penetrates between the developing roller 71 and the layer thickness regulating blade 73 and is borne on the developing roller 71 as a thin layer with a certain thickness. In this manner, the developing roller 71 functions as a developer bearing member that bears the toner that is a developer.

The toner borne on the developing roller 71 is supplied to the electrostatic latent image having been formed on the photosensitive drum 61. Accordingly, toner adheres to the electrostatic latent image and the electrostatic latent image becomes visible, and a toner image is formed on the photosensitive drum 61. Subsequently, the paper sheet S is conveyed between the photosensitive drum 61 and the transfer roller 63, and the toner image (the developer image) on the photosensitive drum 61 is transferred onto the paper sheet S by the transfer roller 63 that is a transferring member. At this point, untransferred toner remaining on the photosensitive drum 61 is collected by the developing roller 71 and returned once again to the developing unit 7.

The fixing apparatus 8 is arranged behind the process cartridge 5 and mainly includes a heating roller 92 and a pressure roller 91 which are fixing members. The paper sheet S to which the toner image has been transferred passes through the fixing apparatus 8 and, in doing so, the paper sheet S is heated and pressurized between the heating roller 92 and the pressure roller 91 and the toner image is fixed onto the paper sheet S. The paper sheet S having passed through the fixing apparatus 8 is discharged onto a paper discharge tray 22.

Configuration of Process Cartridge

Next, each unit of the process cartridge 5 will be described. As described earlier, the process cartridge 5 includes the photosensitive unit 6 and the developing unit 7 that is attachable to and detachable from the photosensitive unit 6.

Configuration of Developing Unit

Figure 2:
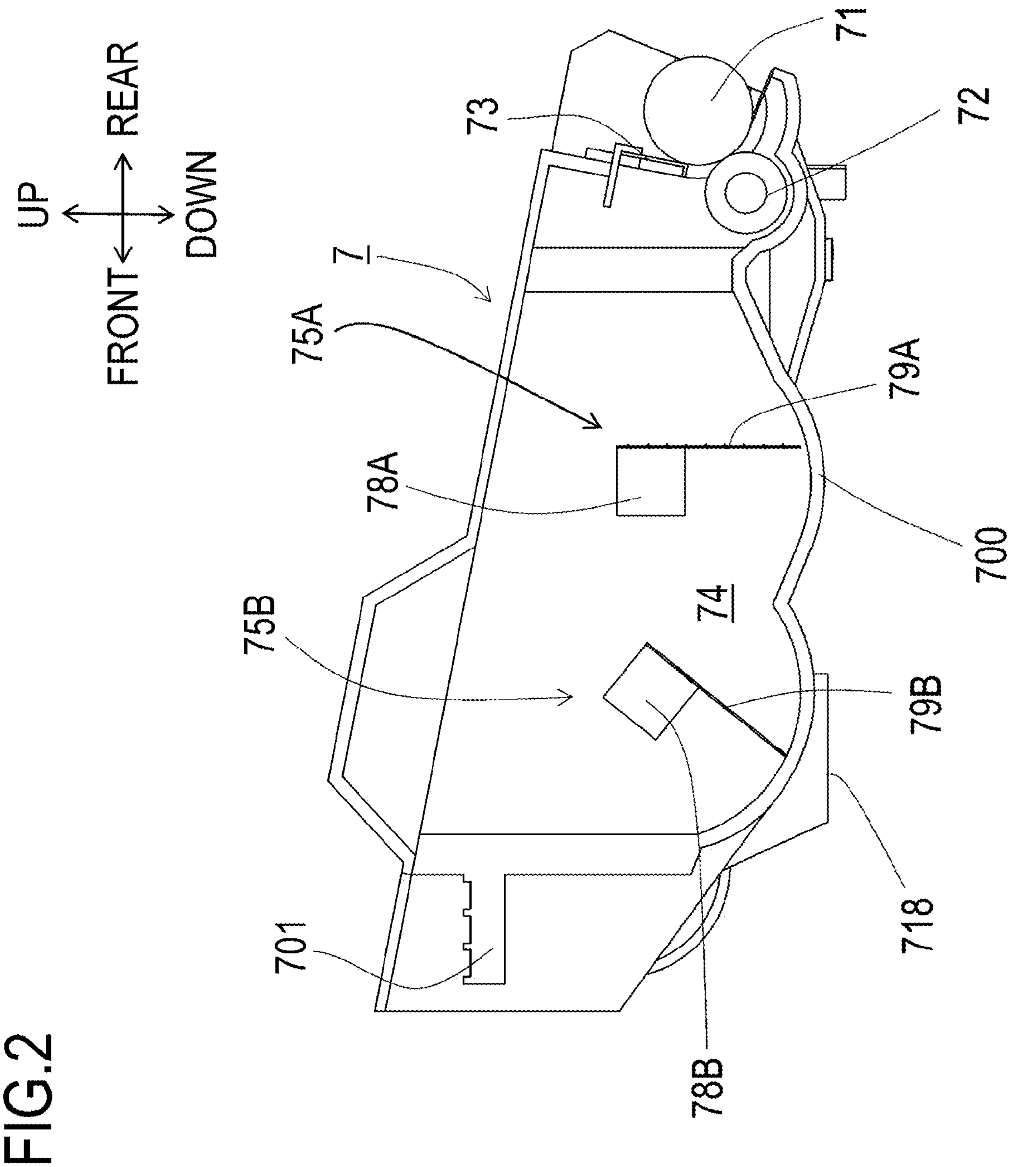
FIG. 2 is a sectional view of a developing unit according to the first embodiment.
Figure 3:
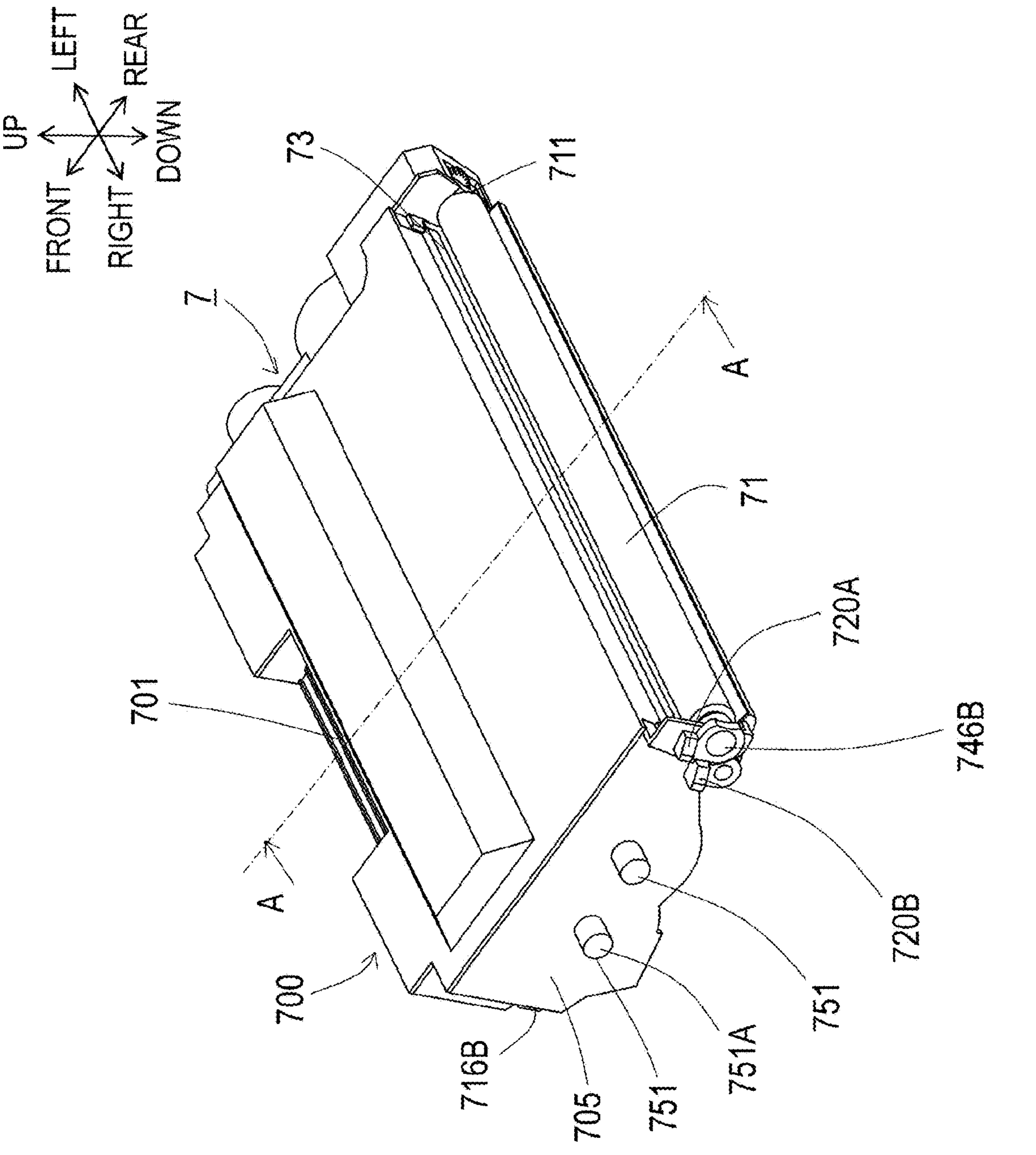
FIG. 3 is a perspective view of the developing unit according to the first embodiment.
Figure 4:
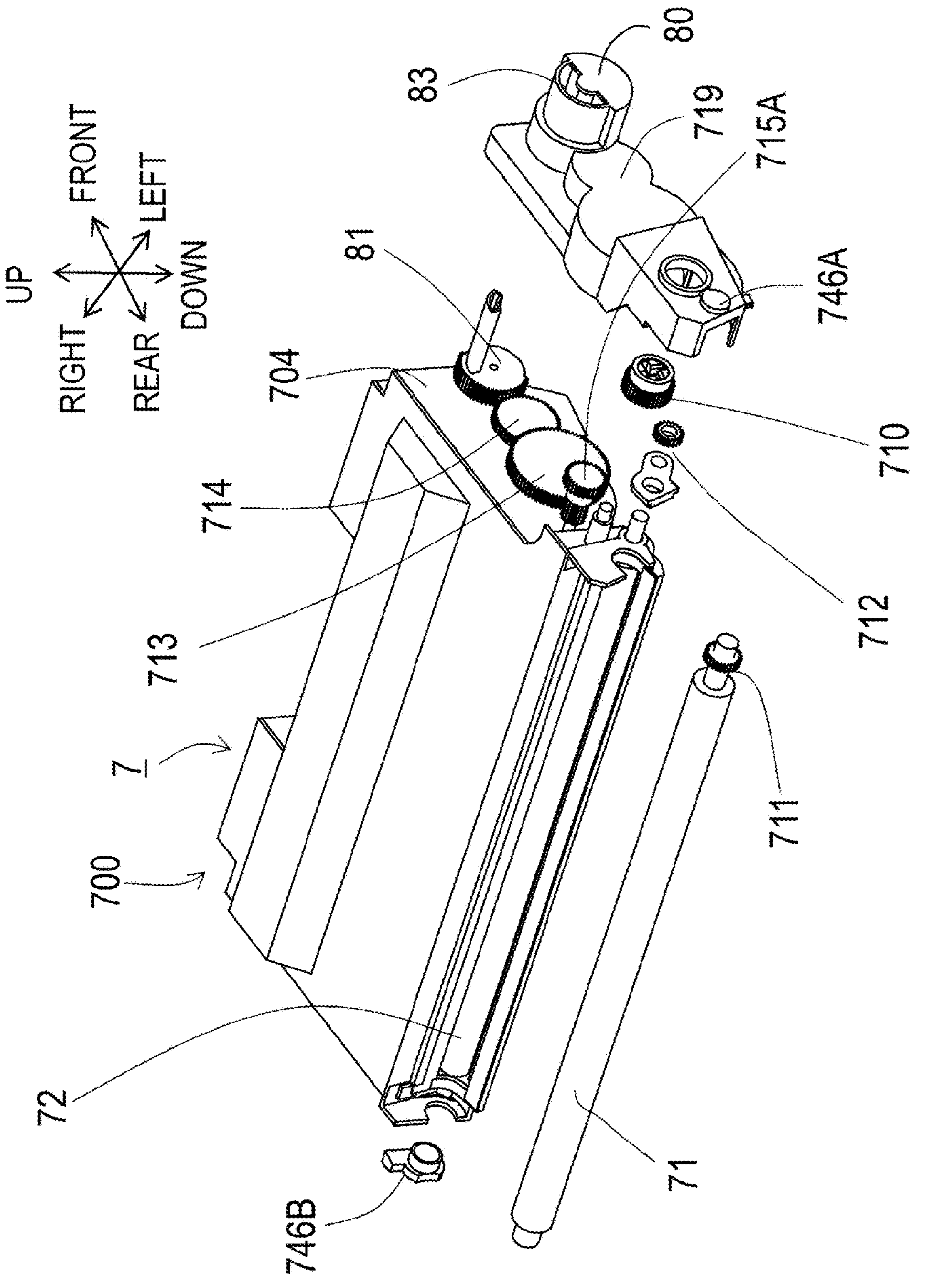
FIG. 4 is an exploded perspective view of the developing unit according to the first embodiment.
Figure 5:
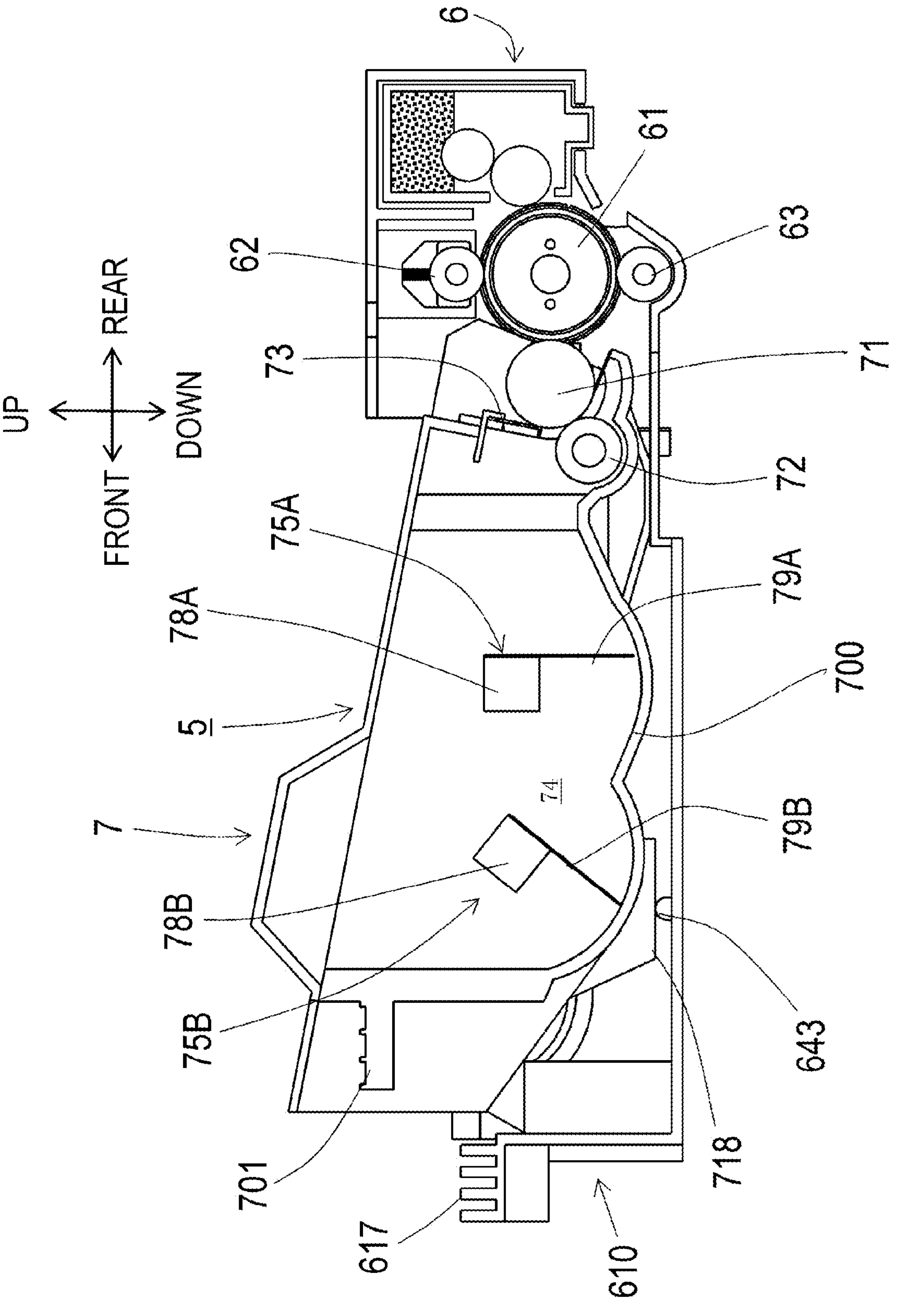
FIG. 5 is a sectional view of a process cartridge according to the first embodiment.
Figure 6:
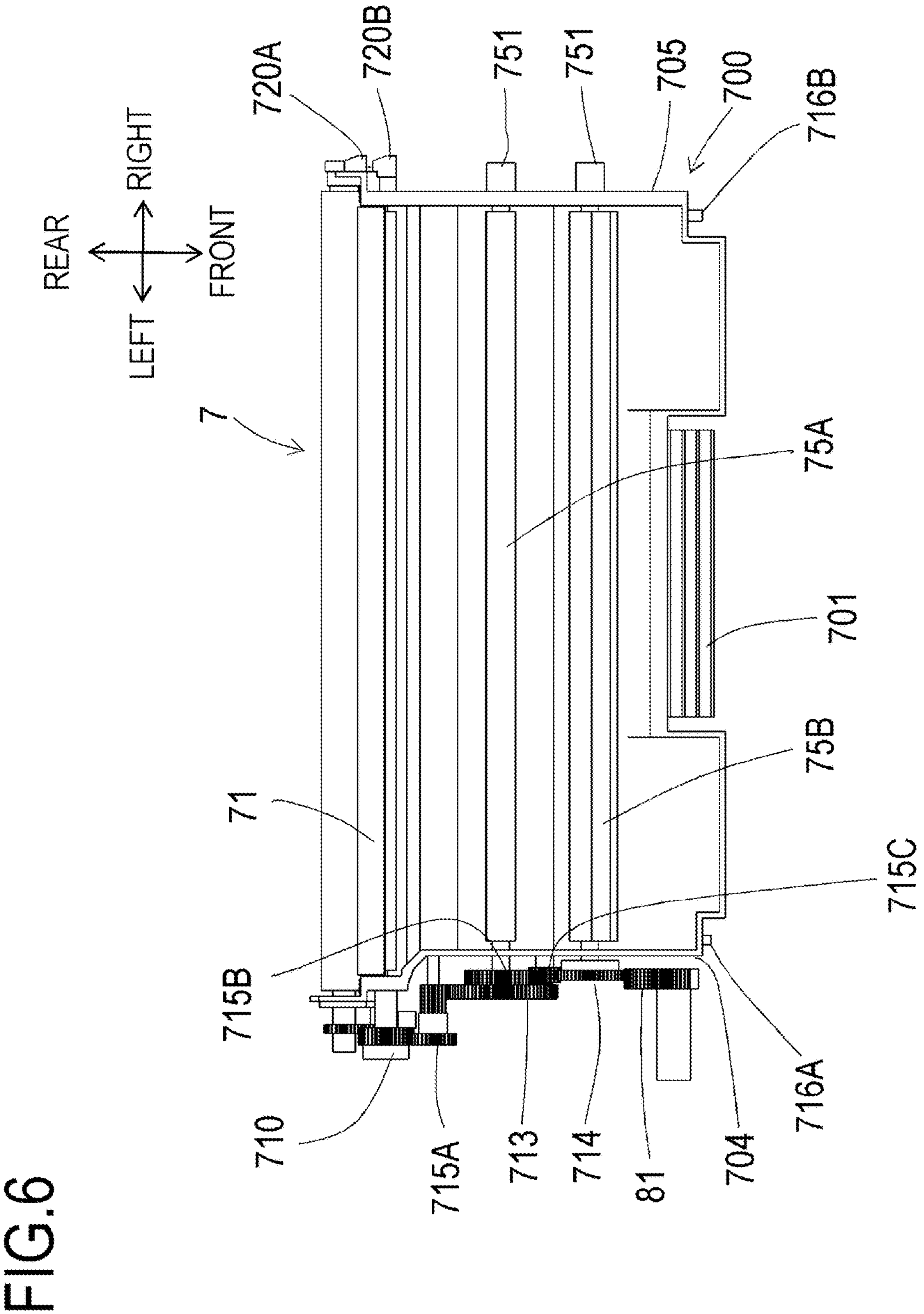
FIG. 6 is a top view of the developing unit according to the first embodiment.
Figure 7:
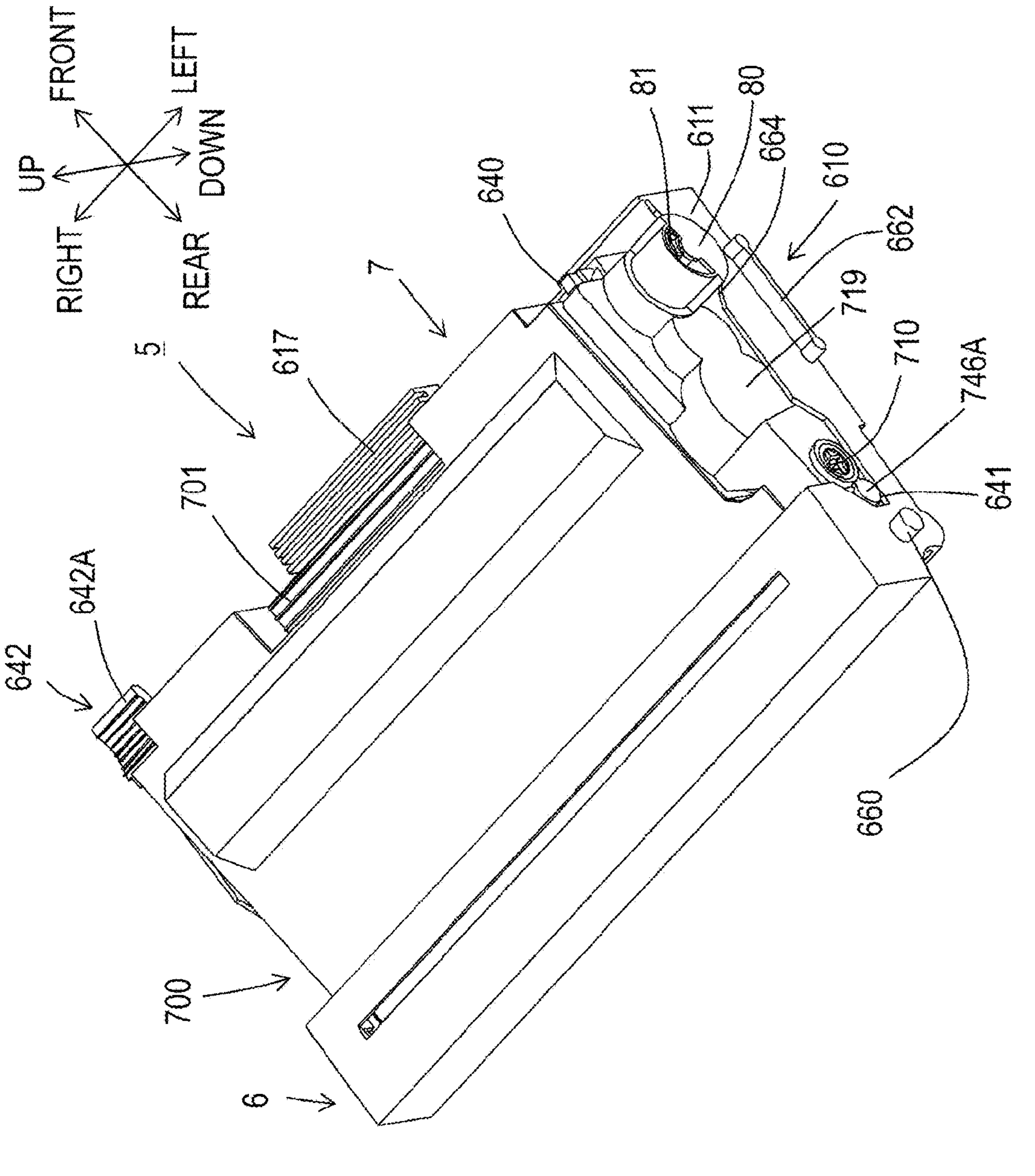
FIG. 7 is a perspective view of the process cartridge according to the first embodiment.

First, a configuration of the developing unit 7 will be described. FIG. 2 is a sectional view of the developing unit 7 taken along A-A in FIG. 3. FIG. 3 is a perspective view of the developing unit 7 from above, and FIG. 7 is a perspective view of the process cartridge 5 from above. FIG. 4 is an exploded perspective view of the developing unit 7. FIG. 5 is a sectional view of the developing unit 7 mounted to the photosensitive unit 6 and a cross section thereof is parallel to the up-down direction and the front-back direction. FIG. 6 is an upper view of the developing unit 7 showing a state where a top surface of a housing 700 and a side holder 719 have been removed for the purpose of illustration.

As shown in FIG. 2, the developing unit 7 has a grip portion 701 to be gripped by a user in front of the housing 700 as a developing frame body, and the developing roller 71 is rotatably supported behind the developing unit 7. Hereinafter, a configuration of the developing unit 7 will be described by referring to the rotational axis direction of the developing roller 71 as an axial direction.

As shown in FIGS. 4 and 6, the developing roller 71, the supplying roller 72, the first agitator (the first stirring member) 75A, and the second agitator (the second stirring member) 75B respectively have both ends thereof being rotatably supported by a left-side wall 704 and a right-side wall 705 of the housing 700. A developing coupling 710, a developing roller gear 711, a supplying roller gear 712, a first agitator gear 713, a second agitator gear 714, and idle gears 715A, 715B, and 715C are provided on a left side of the left-side wall 704 of the housing 700. The developing roller gear 711 is fixed to an end of the developing roller 71, and the supplying roller gear 712 is fixed to an end of the supplying roller 72. In addition, the first agitator gear 713 is fixed to an end of a stirring rod 78A (refer to FIG. 5) of the first agitator 75A, and the second agitator gear 714 is fixed to an end of a stirring rod 78B (refer to FIG. 5) of the second agitator 75B.

As shown in FIG. 3, the developing unit 7 is provided with a first electrical contact 720A which is electrically connected to the developing roller 71 and which is supplied with voltage to be applied to the developing roller 71 and a second electrical contact 720B which is electrically connected to the supplying roller 72 and which is supplied with voltage to be applied to the supplying roller 72. By bringing the electrical contacts into contact with a power supplying contact (not illustrated) provided in the apparatus main body 2, power is supplied to the developing roller 71 and the supplying roller 72.

In conjunction with an operation of closing the door 21 provided on the apparatus main body 2, a developing drive transmitting member (not illustrated) provided in the apparatus main body 2 moves to a position for engaging with the developing coupling 710. Conversely, in conjunction with an operation of opening the door 21, the developing drive transmitting member moves to a position for releasing an engagement with the developing coupling 710.

When the apparatus main body 2 is operated after the door 21 is closed, a driving force is transferred (input) from the developing drive transmitting member to the developing coupling 710 as a driving force receiving member, thereby causing the developing roller 71 to become rotatable via the developing roller gear 711 from a gear provided on a peripheral surface of the developing coupling 710 and the supplying roller 72 to become rotatable via the supplying roller gear 712. The developing drive transmitting member is configured to be capable of transferring a driving force to the developing coupling 710 while allowing positional deviation of the developing coupling 710 within a prescribed range. Movements in the axial direction of the developing coupling 710, the developing roller gear 711, and the supplying roller gear 712 are restricted by the side holder 719 that is attached to the housing 700.

The developing unit 7 adopts two agitators, namely, the first agitator 75A and the second agitator 75B, to stir the toner inside the toner housing portion 74. The first agitator 75A includes the stirring rod 78A and a stirring sheet 79A. The first agitator 75A is configured to be rotatable by receiving a driving force with the first agitator gear 713 from the developing coupling 710 via the idle gear 715A. The second agitator 75B includes the stirring rod 78B and a stirring sheet 79B. The second agitator 75B is configured to be rotatable by receiving a driving force with the second agitator gear 714 from the first agitator gear 713 via the idle gears 715B and 715C.

The second agitator 75B supplies the toner inside the toner housing portion 74 to the side of the first agitator 75A. Toner that is present near the first agitator 75A inside the toner housing portion 74 is stirred by the first agitator 75A, supplied to the side of the supplying roller 72, and further supplied to the developing roller 71 by the supplying roller 72.

In addition, as shown in FIGS. 4 and 7, a detecting portion 80 is provided on a left-side end of the developing unit 7. The detecting portion 80 is provided so as to be capable of detecting a state of an internally-provided detected member 81 with a detecting mechanism (not illustrated) provided in the apparatus main body 2. A state of the detected member 81 enables a determination to be made as to whether the developing unit 7 is unused or the developing unit 7 has already been used.

Figure 8A:
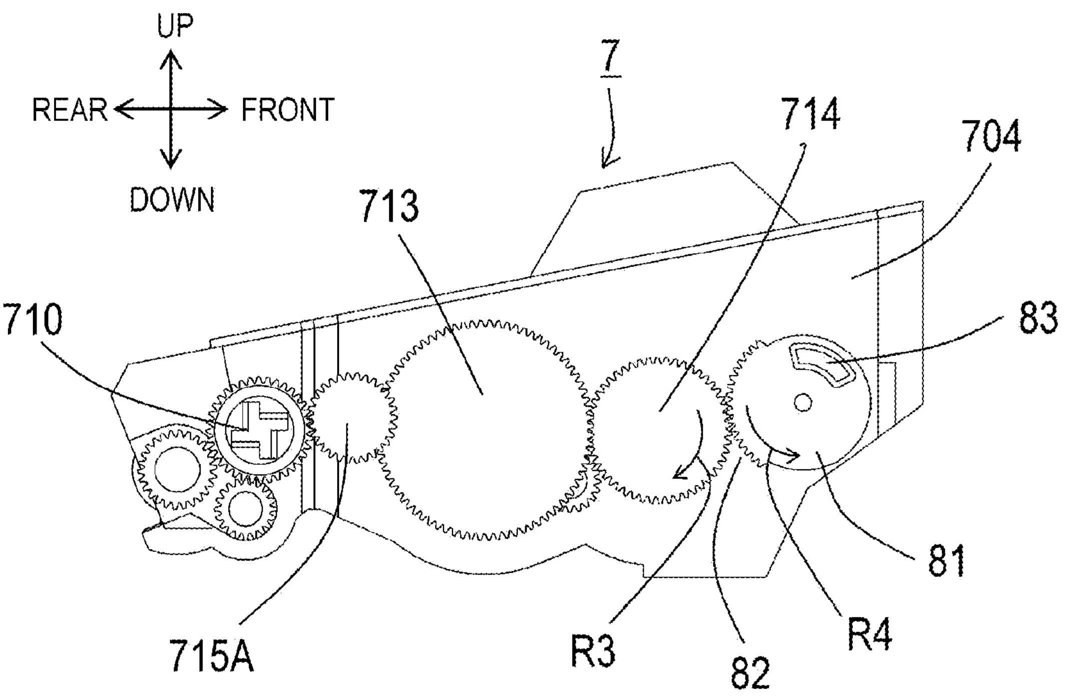
FIGS. 8A and 8B are explanatory diagrams of a detecting member according to the first embodiment.
Figure 8B:
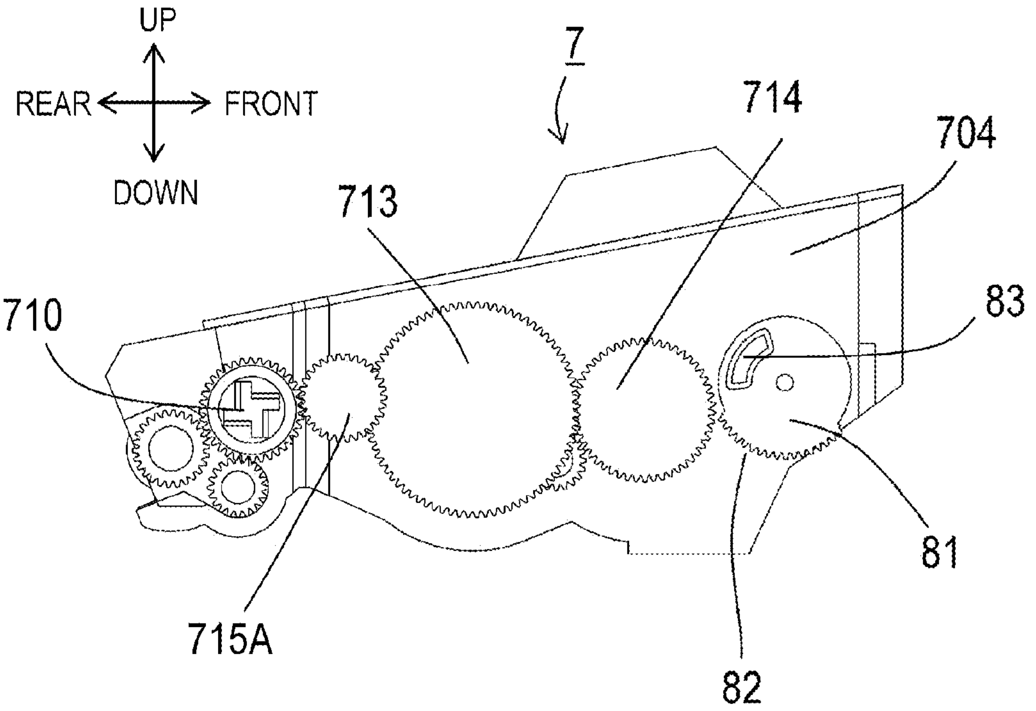

How the detected member 81 operates will be described with reference to FIGS. 8A and 8B. FIGS. 8A and 8B are diagrams of the developing unit 7 as viewed from a left-side side surface. The side holder 719 has been removed in the diagrams for the purpose of illustration. As shown in FIG. 8A, the detected member 81 is provided with a detecting protrusion 83 and a detecting gear 82. As shown in the diagrams, the detecting gear 82 is configured as a partially toothed gear. The detected member 81 receives a driving force to the detecting gear 82 from the second agitator gear 714.

FIG. 8A shows a state where the developing unit 7 is not in use. The detecting protrusion 83 is positioned on an upper front side of the detected member 81. In addition, the detecting gear 82 is meshing with the second agitator gear 714. When the developing unit 7 is used, the second agitator gear 714 rotates in a direction of an arrow R3 in the drawing due to a driving force that the developing coupling 710 receives from the developing drive transmitting member of the apparatus main body 2. At this point, since the detecting gear 82 is meshing with the second agitator gear 714, the detected member 81 rotates in a direction of an arrow R4 in the drawing.

FIG. 8B represents a state after the detected member 81 has rotated. Since the detecting gear 82 is a partially toothed gear, once the detected member 81 rotates in the direction of the arrow R4 in the drawing and runs out of gear teeth for meshing with the second agitator gear 714, the detected member 81 stops rotating. At this point, the detecting protrusion 83 is positioned on an upper rear side of the detected member 81. Detecting the position of the detecting protrusion 83 of the detected member 81 with a detecting mechanism (not illustrated) provided in the apparatus main body 2 enables a determination to be made as to whether the developing unit 7 is unused or the developing unit 7 has already been used.

Figure 9:
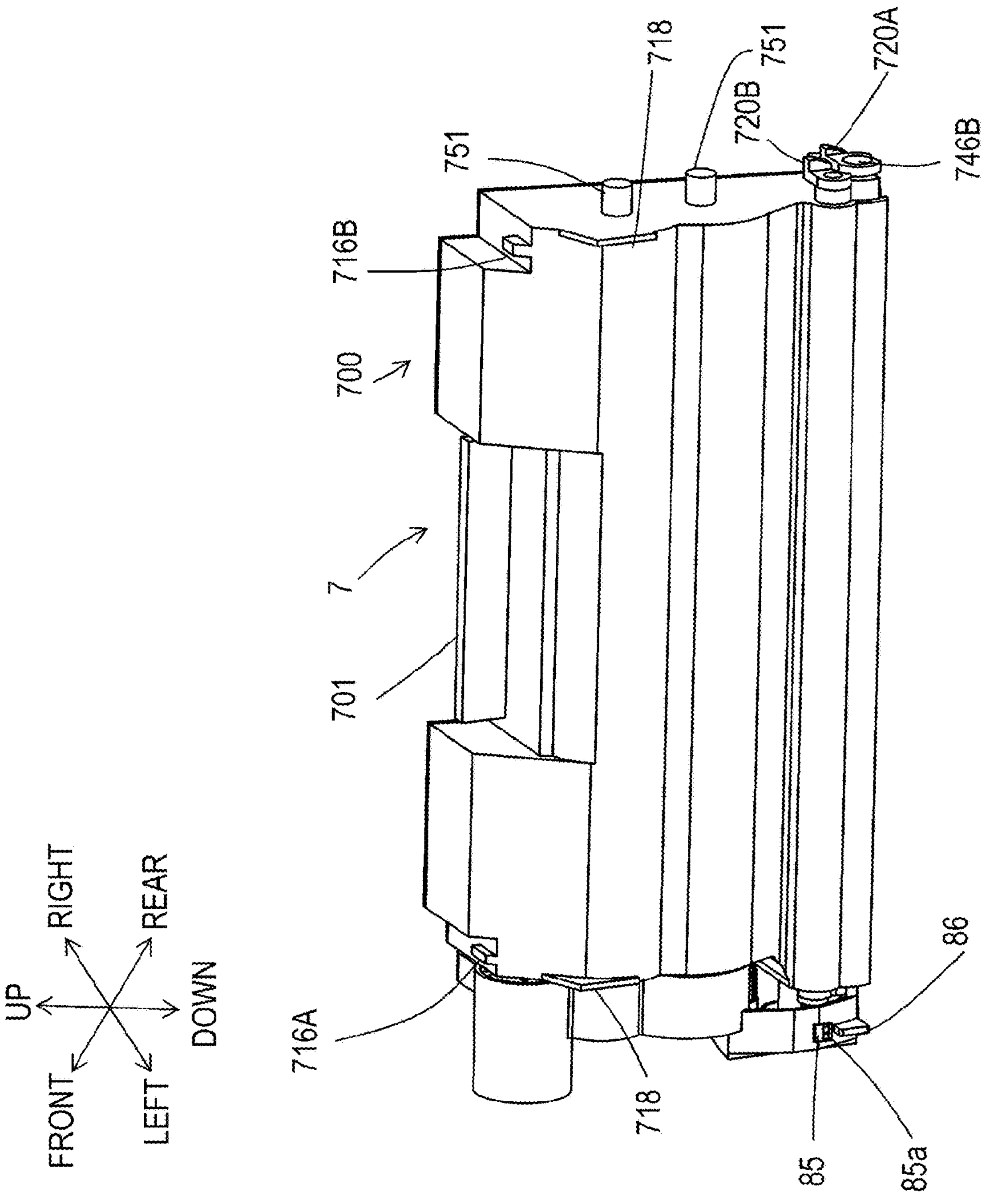
FIG. 9 is a perspective view of the developing unit according to the first embodiment.

FIG. 9 is a perspective view of the developing unit 7 from below. As shown in the drawing, a memory 85 and a positioning projection 86 are provided on a bottom surface of the developing unit 7. The memory 85 includes a memory chip (not illustrated) that stores information related to the developing unit 7 and a memory electrode 85*a* that is conductively connected with the memory chip. The memory electrode 85*a* comes into contact with an electrode (not illustrated) provided in the apparatus main body 2 and enables the memory chip and the apparatus main body 2 to communicate with each other.

Configuration of Photosensitive Unit and Support of Developing Unit

Figure 10:
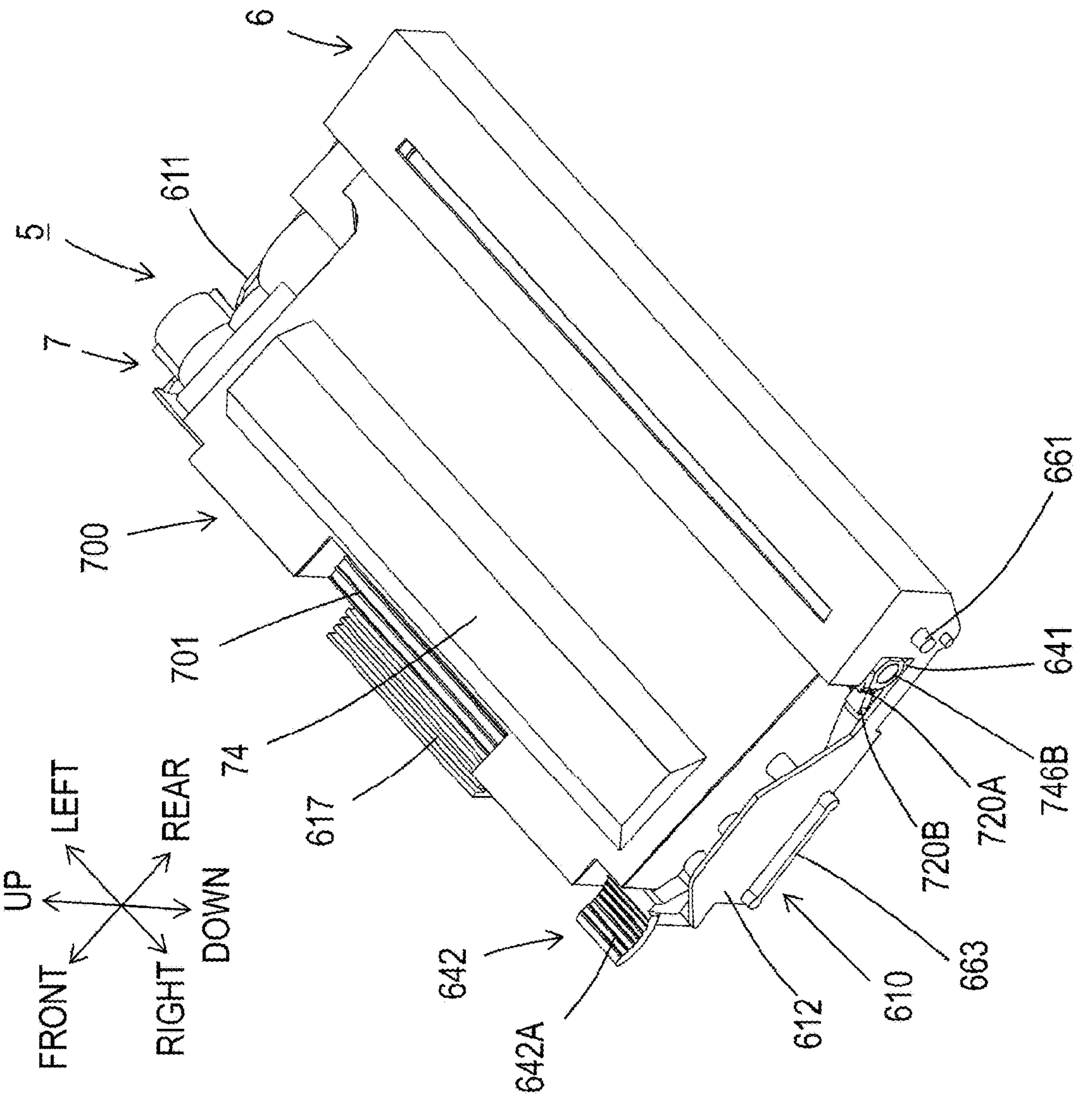
FIG. 10 is a perspective view of the process cartridge according to the first embodiment.
Figure 11A:
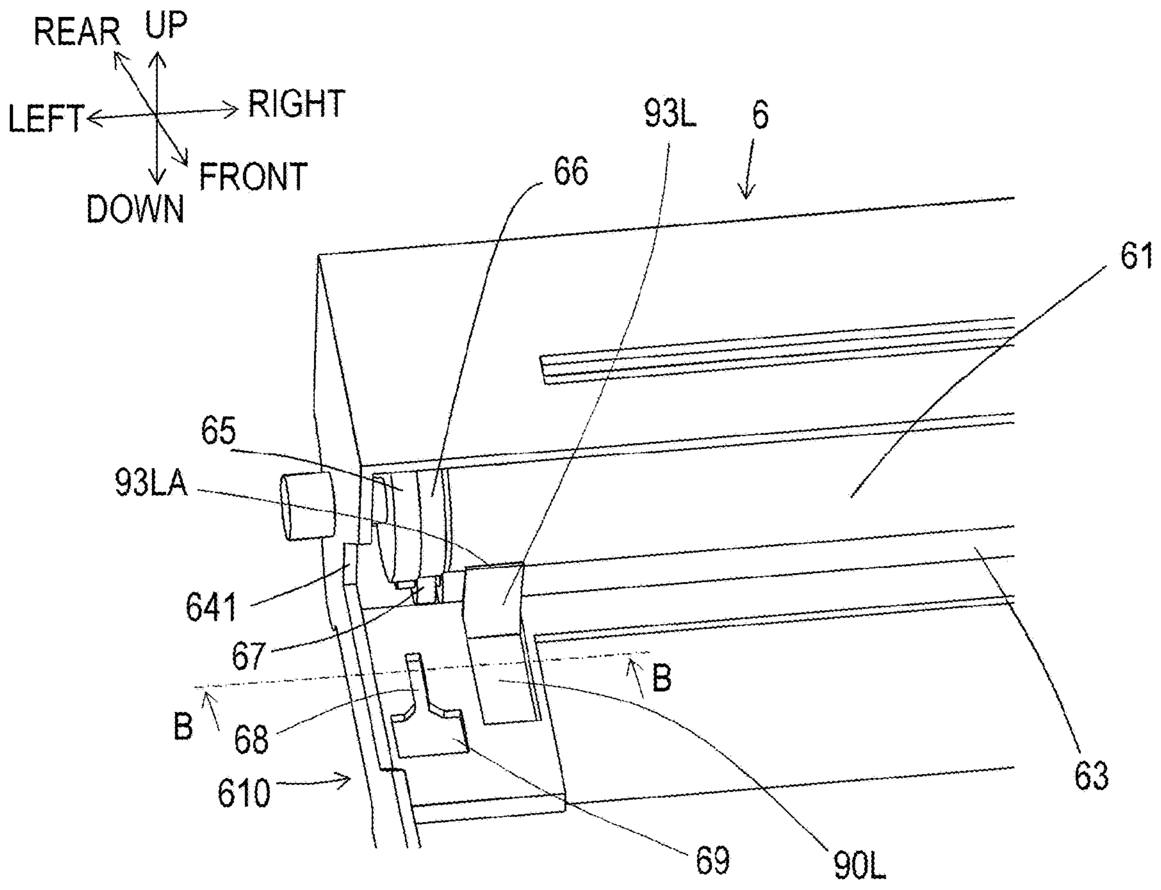
FIGS. 11A and 11B are partial perspective views of a photosensitive unit according to the first embodiment.
Figure 11B:
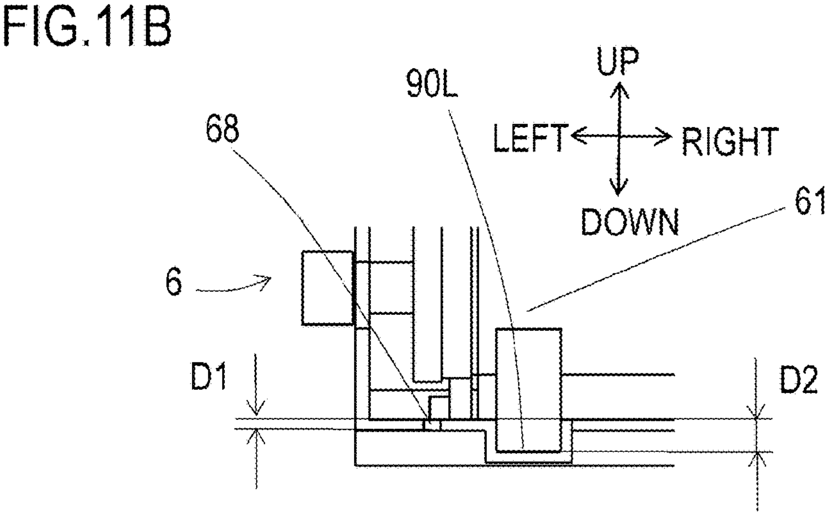
Figure 12:
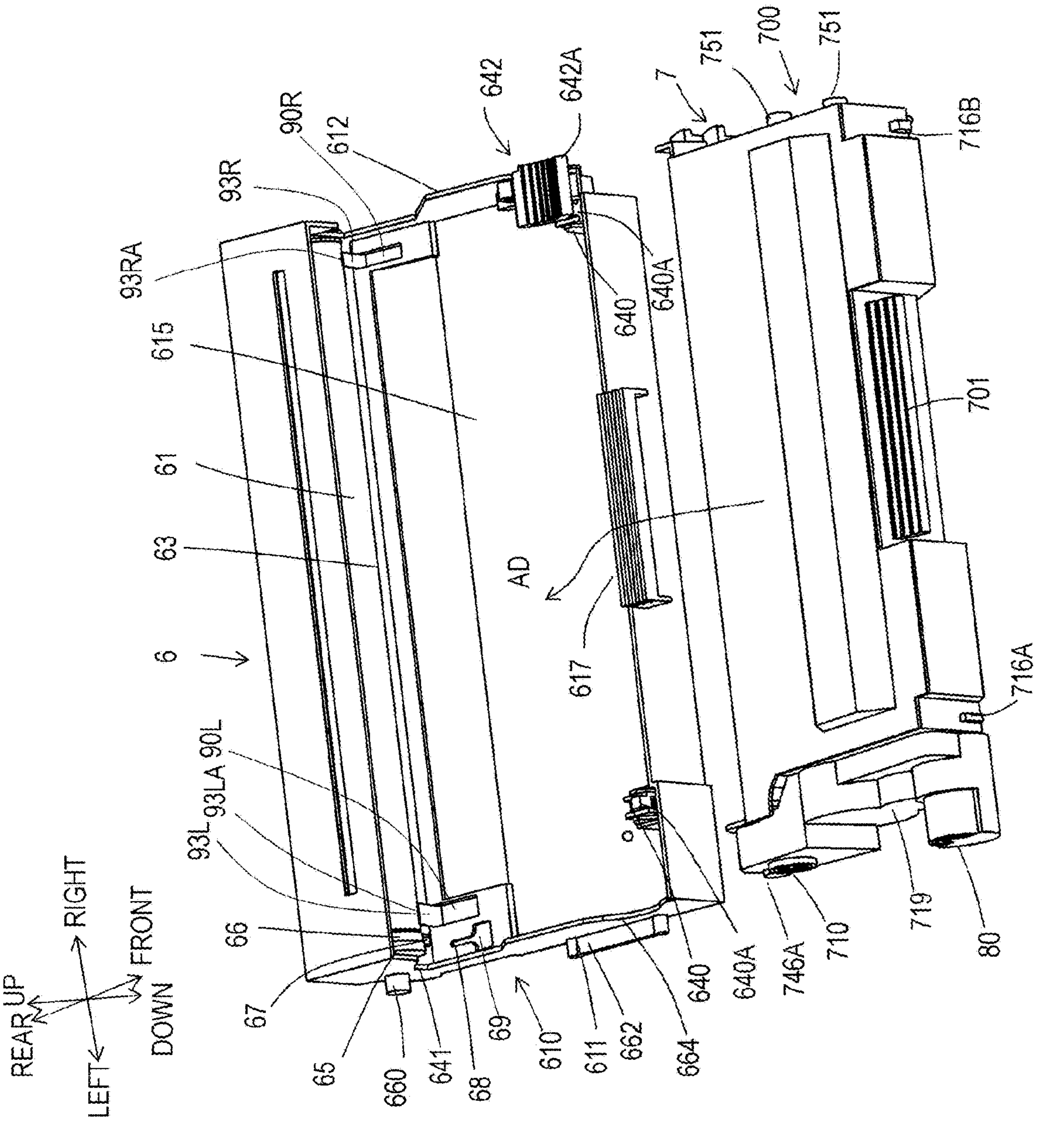
FIG. 12 is a perspective view of the developing unit and the photosensitive unit according to the first embodiment.
Figure 13:
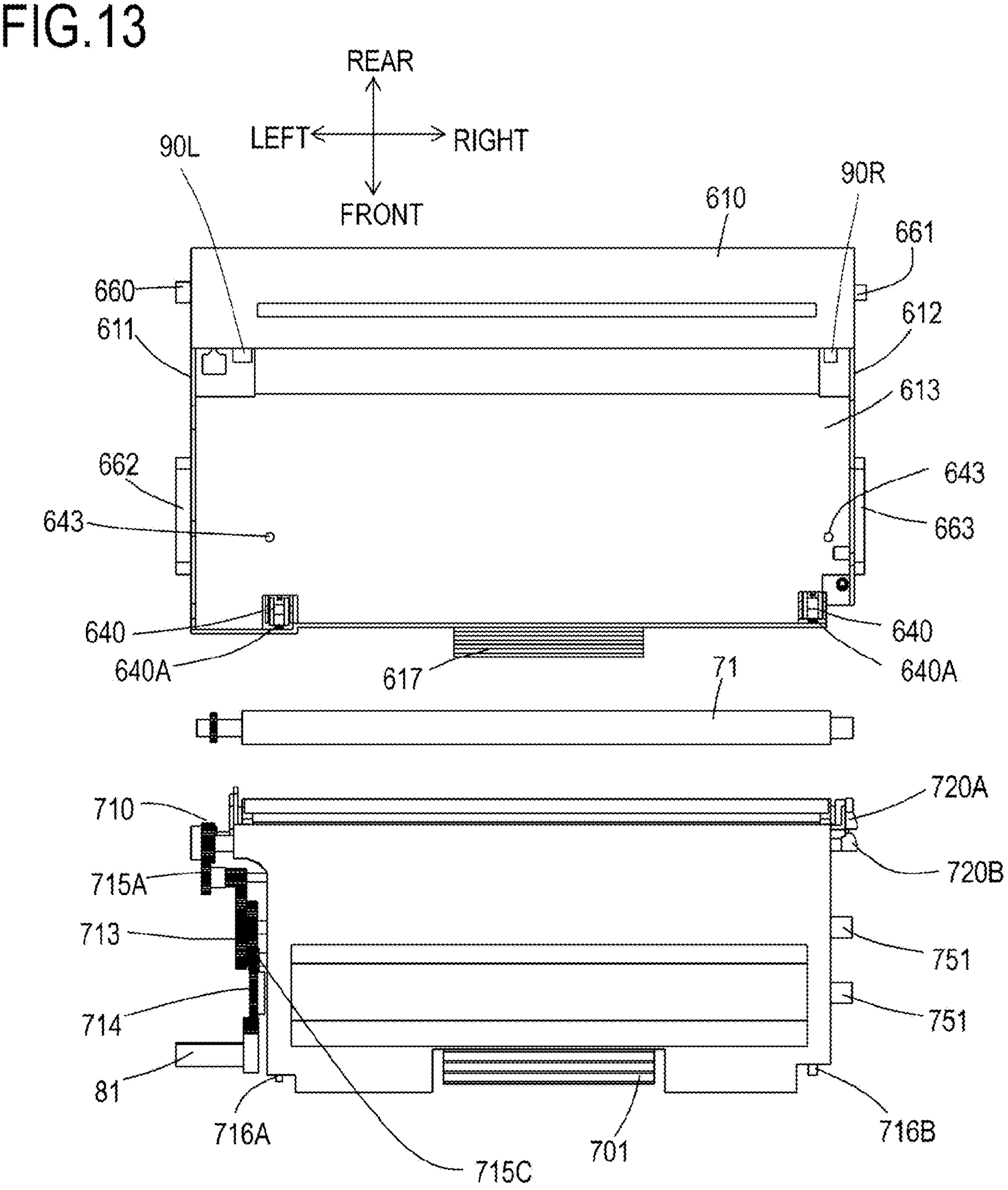
FIG. 13 is a top view of the developing unit and the photosensitive unit according to the first embodiment.
Figure 14A:
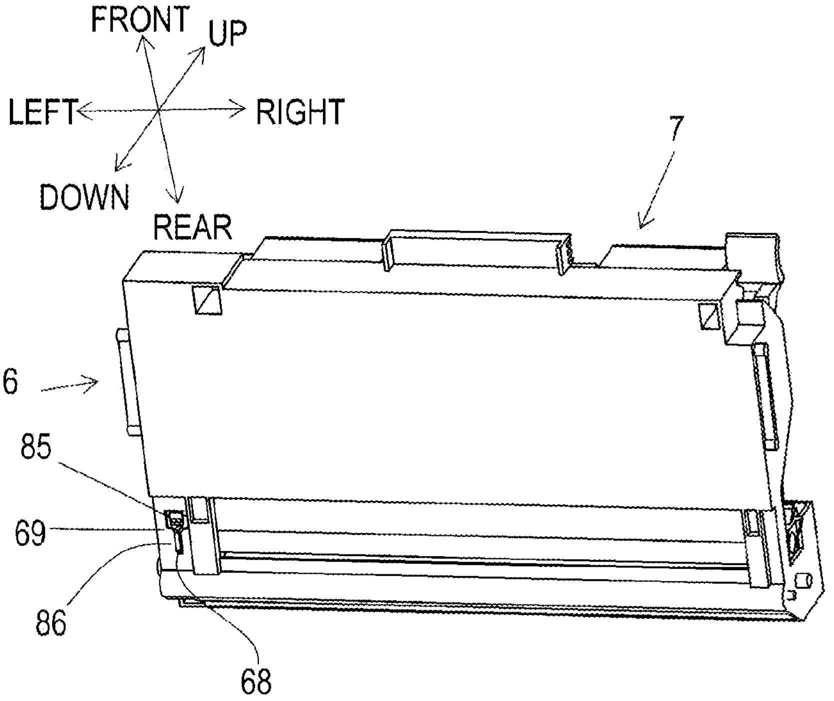
FIGS. 14A and 14B are perspective views of the process cartridge according to the first embodiment.
Figure 14B:
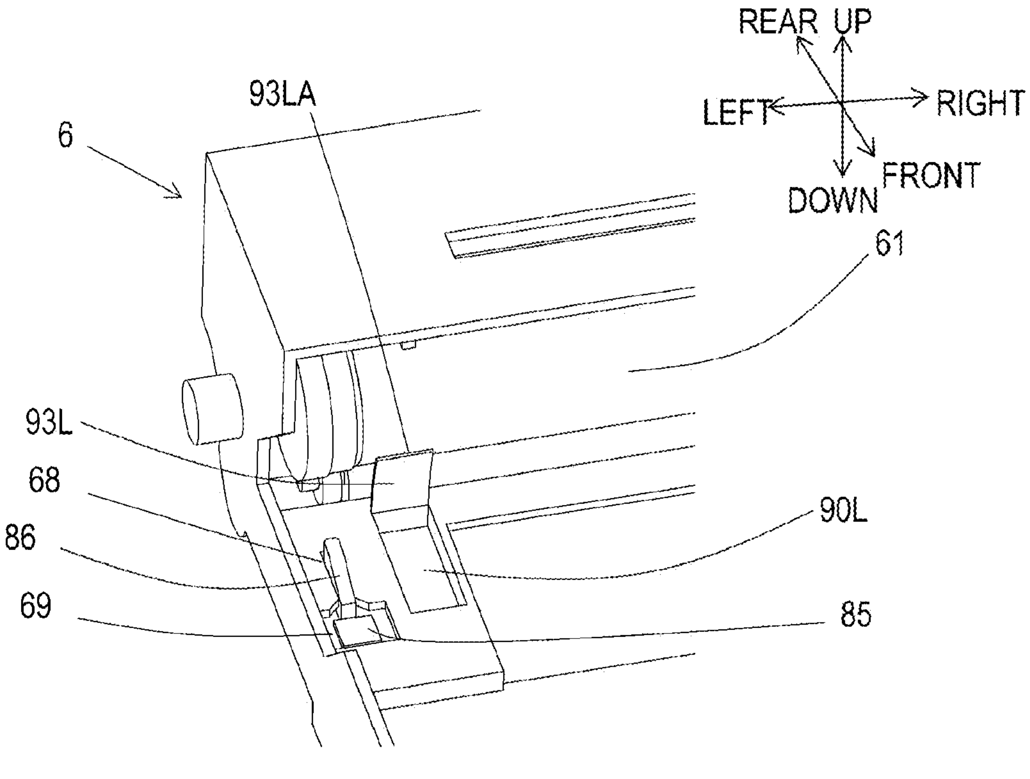

Next, a detailed configuration of the photosensitive unit 6 will be described. FIG. 10 is a perspective view of the process cartridge 5. FIG. 11A is a partial perspective view of the photosensitive unit 6 and FIG. 11B is a sectional view taken along B-B in FIG. 11A. FIG. 12 is a perspective view of the developing unit 7 and the photosensitive unit 6. FIG. 13 is an upper view showing an arrangement relationship in the left-right direction of the photosensitive unit 6, the developing unit 7, and the developing roller 71. FIG. 14A is a perspective view of the process cartridge 5 from below, and FIG. 14B is a perspective view of a positioning portion in the axial direction of the developing unit 7 and the photosensitive drum 61 of the photosensitive unit 6. For the purpose of illustration, only the positioning projection 86 and the memory 85 of the developing unit 7 are depicted in FIG. 14B.

As shown in FIG. 10, the photosensitive unit 6 mainly includes a frame 610 having a left-side wall 611 and a right-side wall 612 which form a pair and the photosensitive drum 61 that is rotatably supported behind the frame 610. A mounting portion 615 (refer to FIG. 12) to which the developing unit 7 is mountable, a grip portion 617 with which the user grips the photosensitive unit 6, a pressing member 640 for pressing the developing unit 7, and a lifting member (a moving member) 642 for lifting the developing unit 7 are provided in front of the frame 610. The lifting member 642 lifts the developing unit 7 having been mounted to the mounting portion 615. The toner housing portion 74 of the developing unit 7 having been mounted to the mounting portion 615 is arranged between the left-side wall 611 and the right-side wall 612 in the left-right direction.

A first positioning projection 660 that coaxially protrudes with the photosensitive drum 61 from the left-side wall 611 and a first guide rib 662 are provided behind the frame 610. In a similar manner, a second positioning projection 661 that coaxially protrudes with the photosensitive drum 61 from the right-side wall 612 and a second guide rib 663 are provided (refer to FIGS. 10 and 13).

A lifespan of the developing unit 7 which is determined based on a toner amount stored in the developing unit 7 is set shorter than a lifespan of the photosensitive unit 6 which is determined based on a thickness of a photosensitive layer of the photosensitive drum 61. Therefore, only the developing unit 7 having reached its lifespan must be replaced separately from the photosensitive unit 6. In this case, the door 21 is opened and the process cartridge 5 is taken out from inside the apparatus main body 2, the developing unit 7 having reached its lifespan is detached from the photosensitive unit 6, and another developing unit 7 is mounted to the photosensitive unit 6 as indicated by a mounting direction AD in FIG. 12. Subsequently, the photosensitive unit 6 mounted with the developing unit 7 is mounted to the apparatus main body 2 as the process cartridge 5.

As shown in FIGS. 7, 10, and 12, a receiving portion 641 that receives rotation bearing members 746A and 746B of the developing roller 71 is formed in front of the photosensitive drum 61 on the left-side wall 611 and the right-side wall 612 of the frame 610. The receiving portion 641 is a depressed portion with an approximate U-shape of which a front side is opened when viewed from a left side and, during the process of mounting the developing unit 7 to the photosensitive unit 6, a rotating shaft of the developing roller 71 is inserted into the receiving portion 641. The receiving portion 641 guides movement of the developing unit 7 in the mounting direction AD shown in FIG. 12 while supporting the developing unit 7 against the photosensitive unit 6.

In addition, as shown in FIG. 13, a projected portion 643 that protrudes upward is provided at both ends in the left-right direction of a bottom surface 613 of the frame 610. The projected portions 643 movably support the developing unit 7 by coming into contact with ribs 718 provided in a bottom portion of the housing 700 of the developing unit 7 shown in FIG. 9.

As shown in FIG. 12, in the photosensitive unit 6, a positioning hole 68 that is provided on the frame 610 and a contact opening 69 are provided on a side of one end in the rotational axis direction (the left-right direction) of the photosensitive drum 61. In this case, the side of one end refers to a same side with respect to a bisector in terms of a length of the photosensitive drum 61 in the left-right direction. When the developing unit 7 is installed in the photosensitive unit 6, the positioning projection 86 of the developing unit 7 is inserted into the positioning hole 68 of the photosensitive unit 6 as shown in FIGS. 14A and 14B. The positioning projection 86 and the positioning hole 68 fit each other in the axial direction (the left-right direction) of the photosensitive drum 61 and determine a position of the developing unit 7 in the left-right direction with respect to the photosensitive unit 6. In addition, the memory 85 of the developing unit 7 is exposed below the process cartridge 5 via the contact opening 69 of the photosensitive unit 6.

In this case, as shown in FIGS. 11A and 14B, the frame 610 of the photosensitive unit 6 is provided with a box-shaped depressed portion 90L on a side of one end in the rotational axis direction (the left-right direction) of the photosensitive drum 61. In addition, the depressed portion 90L is provided at a position that overlaps with the positioning hole 68 when viewed from the rotational axis direction (the left-right direction) of the photosensitive drum 61. Due to the depressed portion 90L, a peripheral position of which strength is reduced by providing the positioning hole 68 is reinforced and the strength thereof is increased. As shown in FIG. 11B, a depth D2 of the depressed portion 90L is set deeper than a depth D1 of the positioning hole 68 to enhance a reinforcement effect. According to the configuration, the strength around the positioning hole 68 of the photosensitive unit 6 is increased and positioning accuracy in the left-right direction of both the developing unit 7 and the photosensitive unit 6 due to the positioning projection 86 of the developing unit 7 and the positioning hole 68 of the photosensitive unit 6 is increased. As a result, positional accuracy between the memory electrode 85*a* of the memory 85 and the electrode provided in the apparatus main body 2 increases and a reliable contact between electrodes can be achieved.

As shown in FIGS. 11A and 14B, a sheet member 93L is provided on a side of the photosensitive drum 61 of the depressed portion 90L. A tip portion 93LA of the sheet member 93L is in contact with the photosensitive drum 61. According to the configuration, image defects are prevented by scraping off unnecessary toner and foreign substances such as paper dust having adhered to the surface of the photosensitive drum 61 during image formation with the tip portion 93LA. In the present configuration, unnecessary toner and foreign substances such as paper dust having been scraped off are dropped into and collected by the depressed portion 90L. Therefore, occurrences of contamination of the process cartridge 5 and image defects due to foreign substances dropping onto the paper sheet S which are caused by scattering of the foreign substances can be prevented. Using the depressed portion 90L for the purposes of structural reinforcement and foreign substance collection as described above eliminates the need to provide a component for foreign substance collection separate from the depressed portion 90L and enables cartridges to be downsized and configurations to be simplified.

As shown in FIG. 12, a foreign substance box 90R including a box-shaped depressed portion is provided on an opposite side in the left-right direction to the positioning hole 68 of the photosensitive unit 6. A sheet member 93R is provided on the side of the photosensitive drum 61 of the foreign substance box 90R. A tip portion 93RA of the sheet member 93R is in contact with the photosensitive drum 61. In a similar manner to the sheet member 93L described earlier, image defects are prevented by scraping off unnecessary toner and foreign substances such as paper dust having adhered to the surface of the photosensitive drum 61 during image formation with the tip portion 93RA. Unnecessary toner and foreign substances such as paper dust having been scraped off are dropped into the foreign substance box 90R and collected inside the box.

As shown in FIG. 12, a pressing member 640 is provided in front of the frame 610 and at both ends of the frame 610 with respect to the left-right direction. The pressing member 640 is biased in a direction from the front toward the rear by a compression spring 640A as a biasing member. Therefore, due to a biasing force of the compression spring 640A, the pressing member 640 presses each of pressed ribs 716A and 716B that are provided on the housing 700 of the developing unit 7. By pressing the developing unit 7 with the pressing member 640, the developing roller 71 is biased toward the photosensitive drum 61.

As shown in FIGS. 12 and 7, a depressed portion 664 is provided on the left-side wall 611 of the photosensitive unit 6 and the detecting portion 80 of the developing unit 7 is positioned in the depressed portion 664. Since the depressed portion 664 reduces rigidity of the frame 610, a part of the first guide rib 662 is arranged below the depressed portion 664 so as to overlap with a depressed portion 664. Since the first guide rib 662 acts as a reinforcing member, a decline in the rigidity of the frame 610 can be reduced.

In addition, as shown in FIG. 11A, a photosensitive member gear (a first gear) 65 and a transfer gear (a second gear) 66 are fixed to a left end of the photosensitive drum 61 and are configured to integrally rotate with the photosensitive drum 61. When the process cartridge 5 is mounted to the apparatus main body 2, as a drive gear (not illustrated) of the apparatus main body 2 and the photosensitive member gear 65 mesh with each other, a driving force is transferred to the photosensitive drum 61 and the transfer gear 66 and the photosensitive drum 61 and the transfer gear 66 become rotatable. Furthermore, the transfer gear 66 meshes with a transfer roller gear (a third gear) 67 that is fixed to a left end of the transfer roller 63 and the transfer roller 63 also becomes rotatable.

Lifting Mechanism of Developing Unit 7

Figure 15:
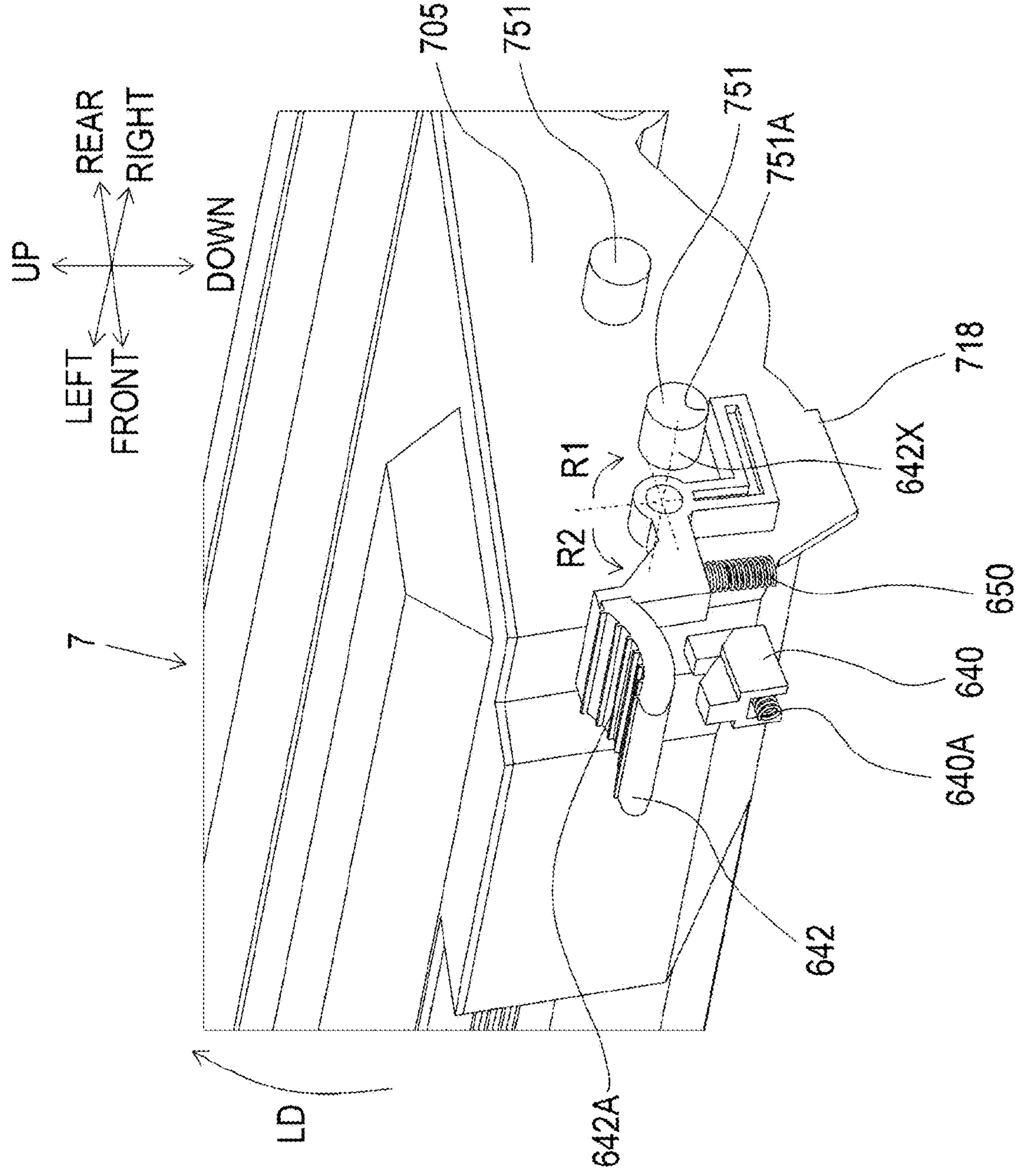
FIG. 15 is a partial perspective view of the developing unit and a lifting member according to the first embodiment.
Figure 16A:
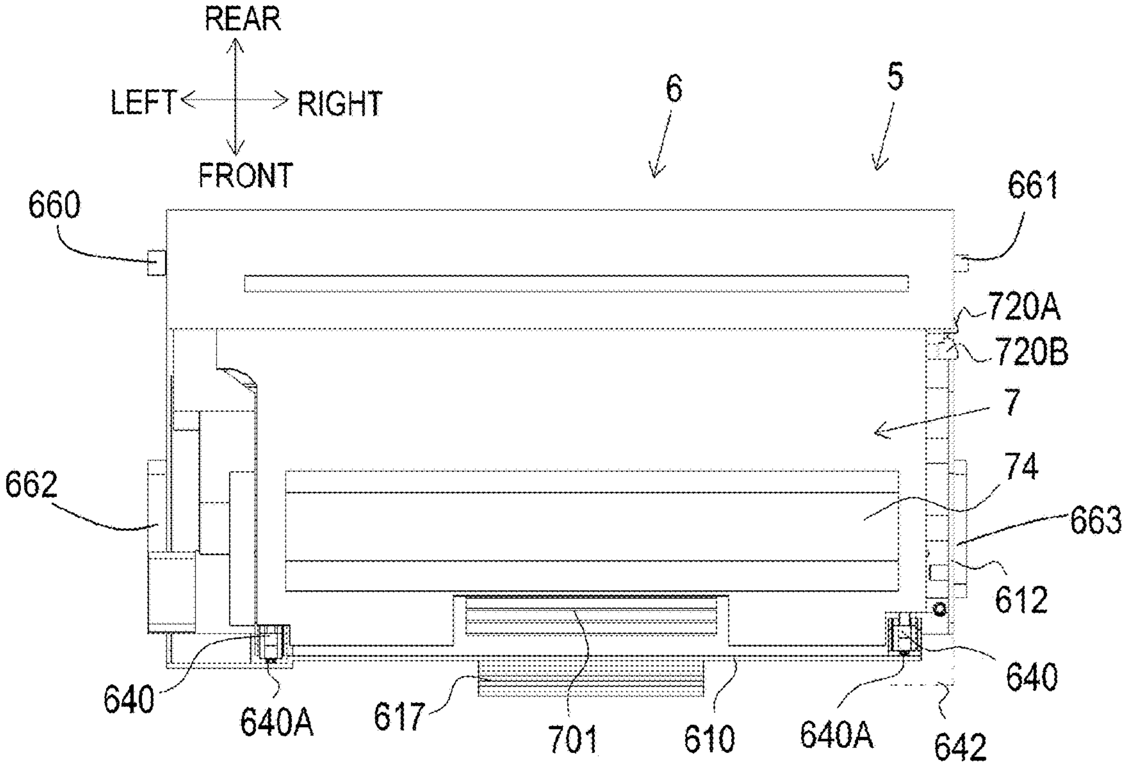
FIGS. 16A and 16B are diagrams showing a positional relationship of the lifting member and a pressing member according to the first embodiment.
Figure 16B:
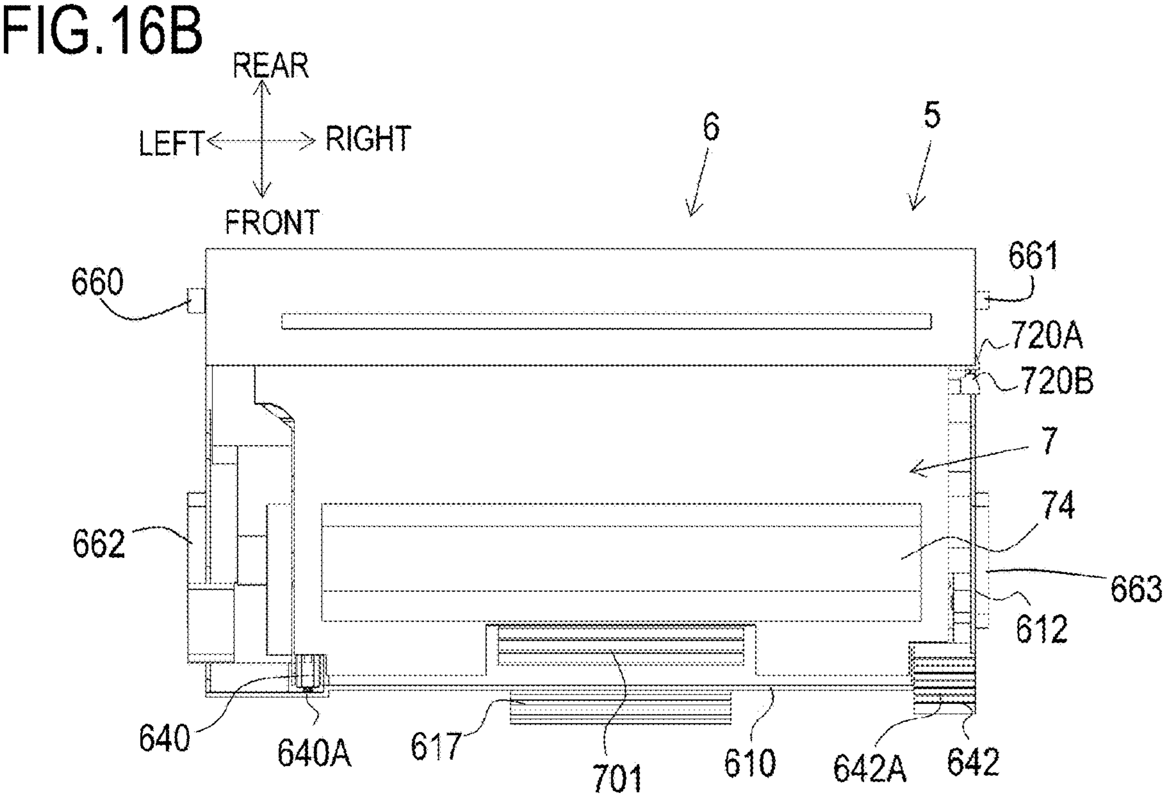
Figure 17A:
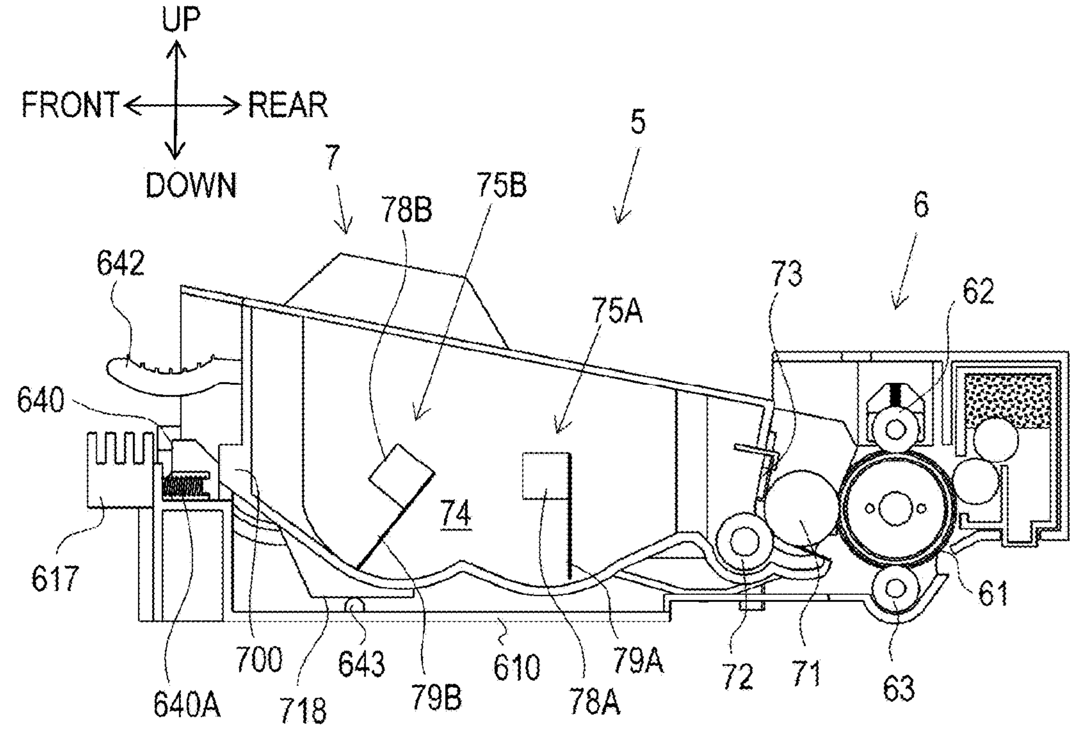
FIGS. 17A and 17B are diagrams showing separation of the developing unit according to the first embodiment.
Figure 17B:
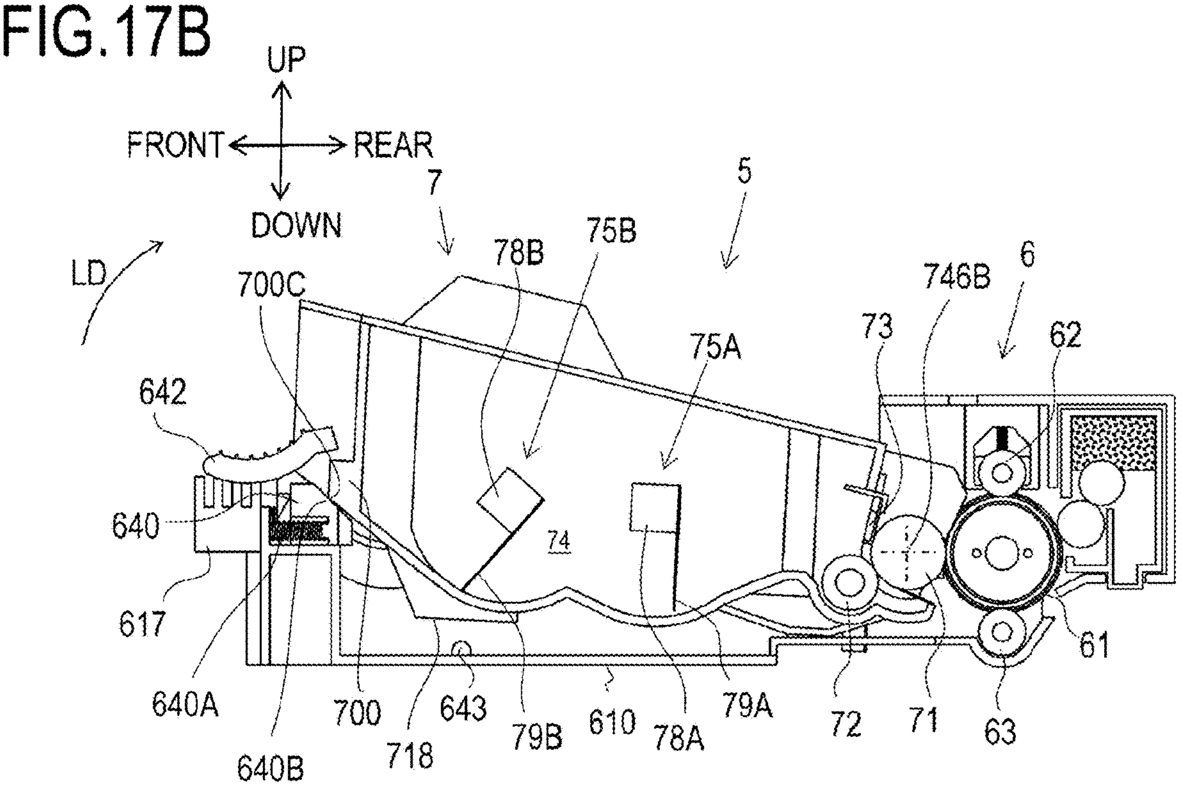

FIG. 15 is a partial perspective view of the developing unit 7 and the lifting member 642. FIGS. 16A and 16B are top views of the photosensitive unit 6 mounted with the developing unit 7 in which FIG. 16A shows the photosensitive unit 6 through the lifting member 642 and FIG. 16B shows the photosensitive unit 6 without making the lifting member 642 invisible. FIGS. 17A and 17B are sectional views of the photosensitive unit 6 and the developing unit 7 and a cross section thereof is parallel to the up-down direction and the front-back direction. FIG. 17A represents a state where the developing unit 7 is mounted to the photosensitive unit 6 and FIG. 17B represents a state where the developing unit 7 is placed on top of the photosensitive unit 6.

The developing unit 7 having been mounted to the photosensitive unit 6 transitions to a lift-up state by a lifting mechanism and is subsequently detached from the photosensitive unit 6. The lifting mechanism will be described in detail below.

As shown in FIGS. 15, 17A and 17B, at least a part of the lifting member 642 is arranged on a front side of the housing 700 of the developing unit 7 and rotatably supported by the right-side wall 612 in a state where the lifting member 642 is receiving a force created by a compression spring 650. In addition, at least a part of the lifting member 642 is arranged so as to overlap with the right-side wall 705 of the housing 700 that houses toner and the pressing member 640 in the front-back direction. A rotational axis 642X of the lifting member 642 is parallel to the left-right direction (the axial direction of the photosensitive drum 61). The lifting member 642 is biased so as to rotate in an R1 direction by the force created by the compression spring 650.

As the user pushes an operating portion 642A of the lifting member 642 against the force created by the compression spring 650 and rotates the lifting member 642 in an R2 direction, the lifting member 642 presses a protruded portion 751 and moves the developing unit 7 in a separating direction LD in which the developing unit 7 separates from the photosensitive unit 6. Accordingly, the developing unit 7 enters a state where the developing unit 7 can be detached from the photosensitive unit 6. The operating portion 642A is arranged on a side of a right end (a side of one end) of the photosensitive unit 6.

As shown in FIG. 17A, in a mounted state where the developing unit 7 is mounted to the photosensitive unit 6, due to the housing 700 being pressed by the pressing member 640, the developing roller 71 is pushed toward the photosensitive drum 61. In addition, the developing unit 7 is locked by the pressing member 640 so as to prevent the developing unit 7 from separating from the photosensitive unit 6. As shown in FIG. 15, an end of the lifting member

642 causes a contact surface (a contact portion) 751A of the protruded portion 751 of the housing 700 to move upward.

Accordingly, the developing unit 7 can be moved in the separating direction LD from a mounting position where the developing unit 7 is mounted to the mounting portion 615 (refer to FIG. 12) and can be separated from the photosensitive unit 6.

As shown in FIG. 17B, as a front portion of the developing unit 7 separates from the photosensitive unit 6, the developing unit 7 is held at a temporary support portion where a supported surface 700C of the housing 700 is supported by a holding portion 640B of the pressing member 640. In addition, the developing unit 7 at the temporary support portion is in a state where the rotation bearing member 746B (746A) of the developing roller 71 is supported by the receiving portion 641. This state will be referred to as a lift-up state. At this point, the lock (restraint of the developing unit 7 from being detached from the photosensitive unit 6) has been released. In the lift-up state, by gripping the grip portion 701 and lifting up the developing unit 7 as it is, the user can detach the developing unit 7 from the photosensitive unit 6 without having to move the other members. In this manner, the user can detach the developing unit 7 from the photosensitive unit 6 and mount a new developing unit 7 to the photosensitive unit 6.

Next, a characteristic configuration of the photosensitive unit 6 according to the first embodiment will be described in detail with reference to FIGS. 18 to 22.

Figure 18:
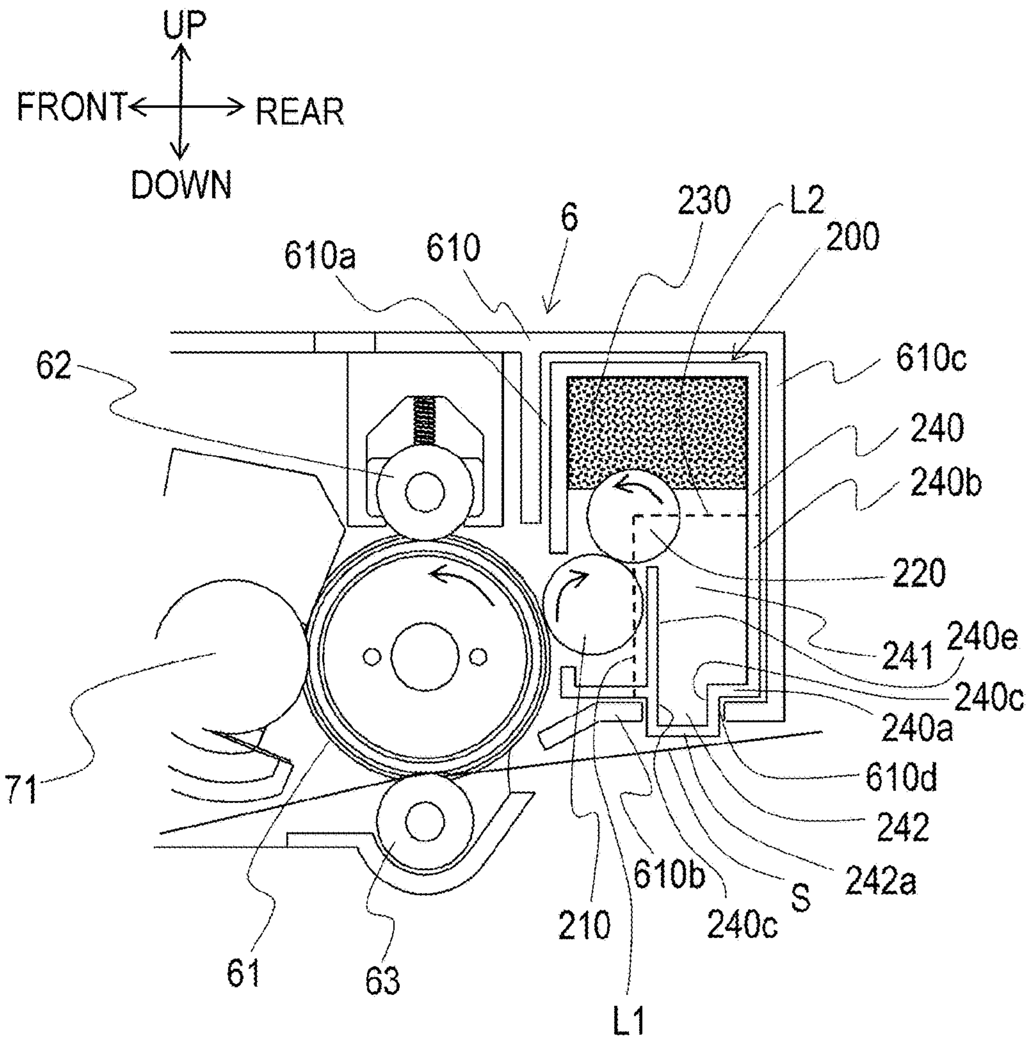
FIG. 18 is a sectional view of the photosensitive unit and a cleaning unit according to the first embodiment.
Figure 19:
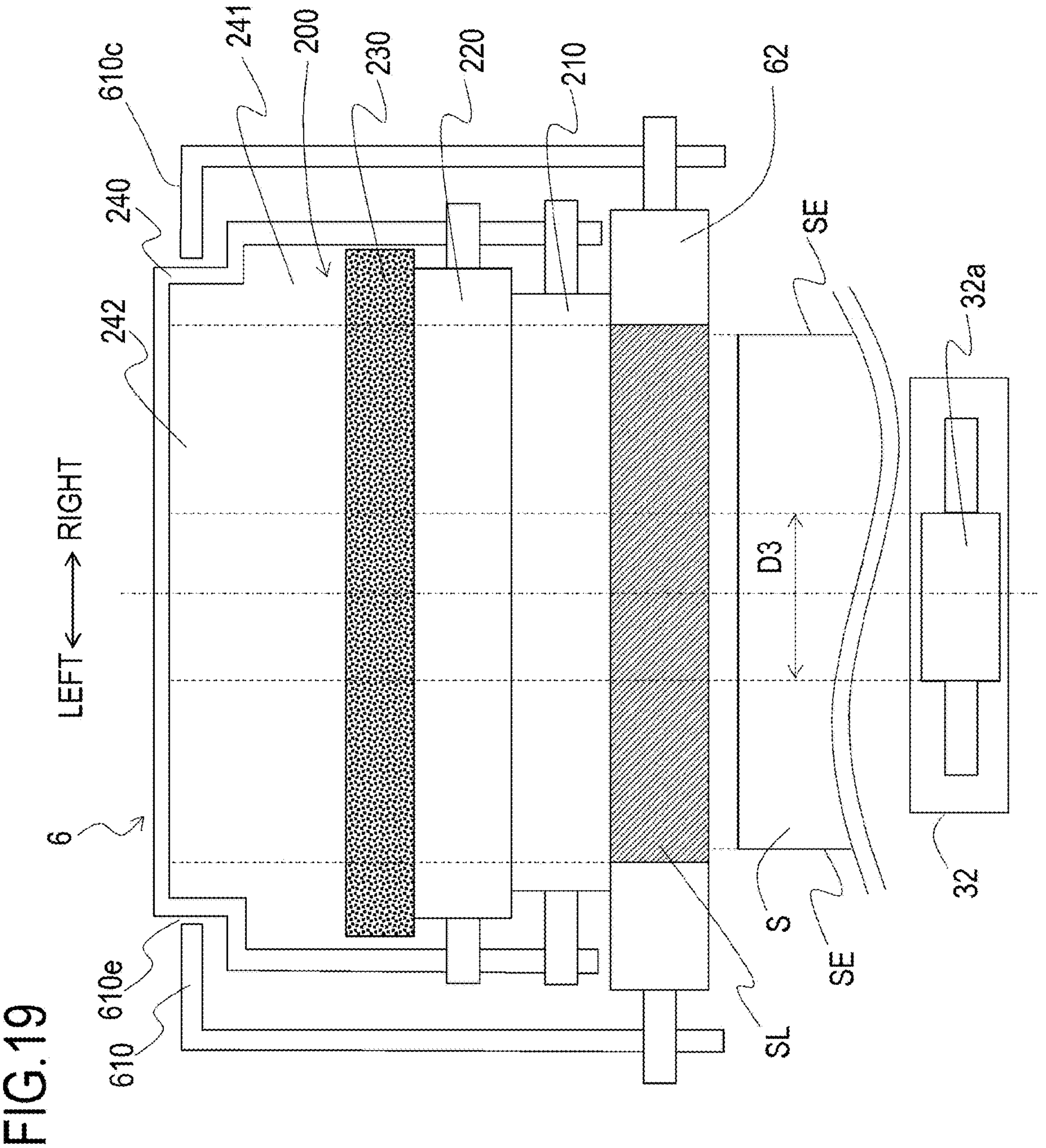
FIG. 19 is a diagram showing sizes of respective portions in a left-right direction according to the first embodiment.
Figure 20:
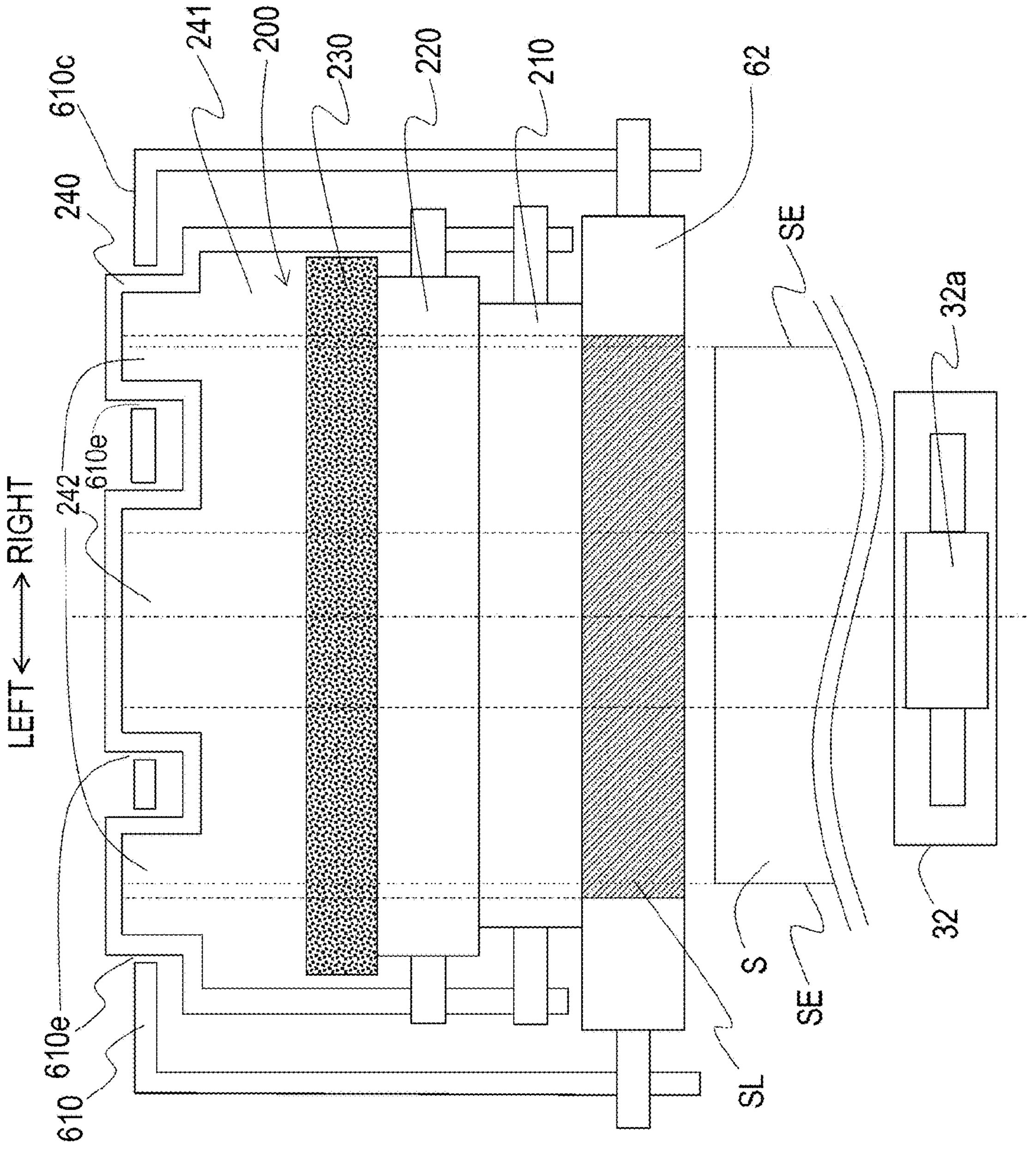
FIG. 20 is a diagram showing sizes of respective portions in the left-right direction according to the first embodiment.
Figure 21A:
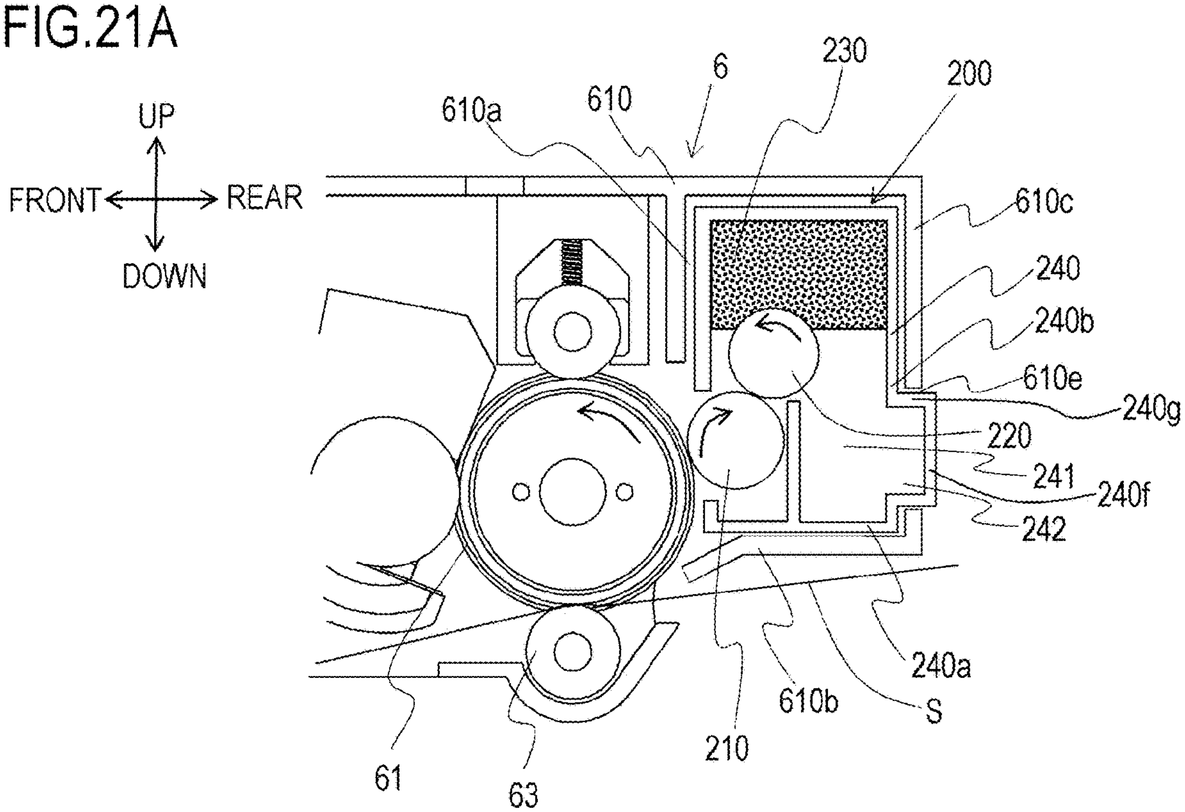
FIGS. 21A and 21B are sectional views showing another mode of a foreign substance collecting depressed portion according to the first embodiment.
Figure 21B:
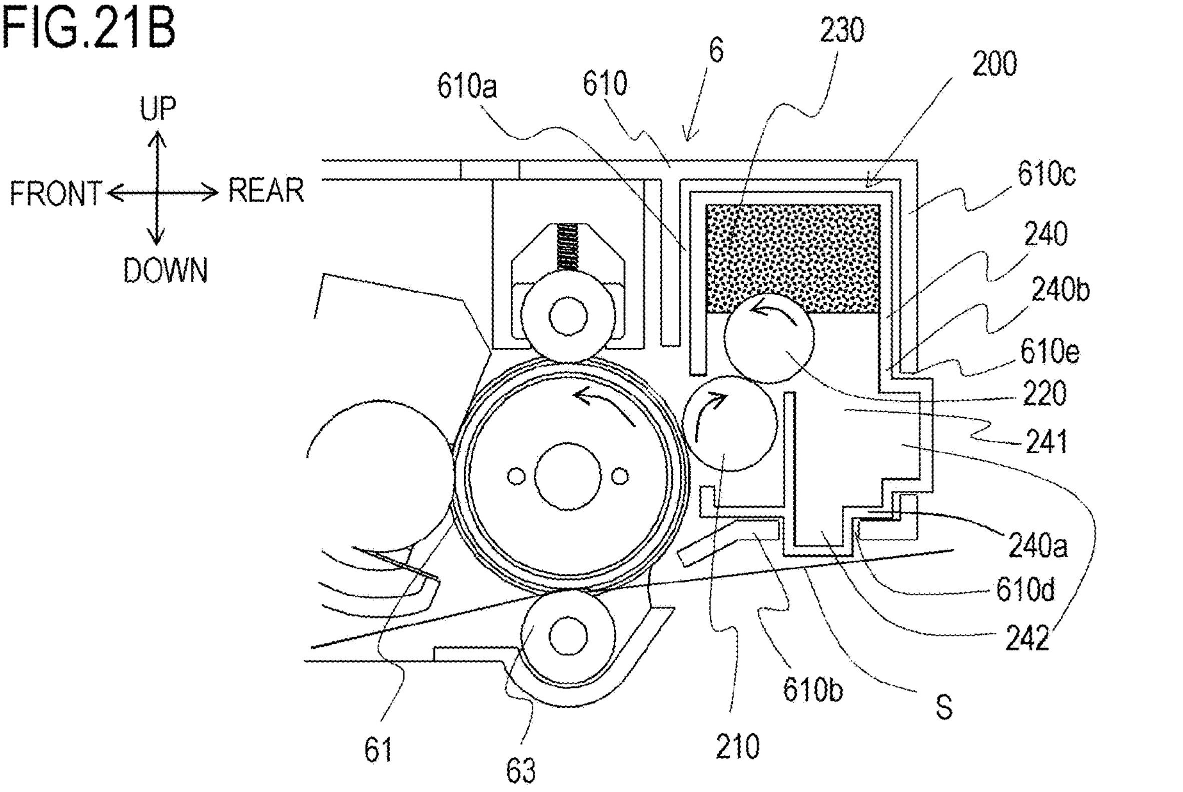
Figure 22:
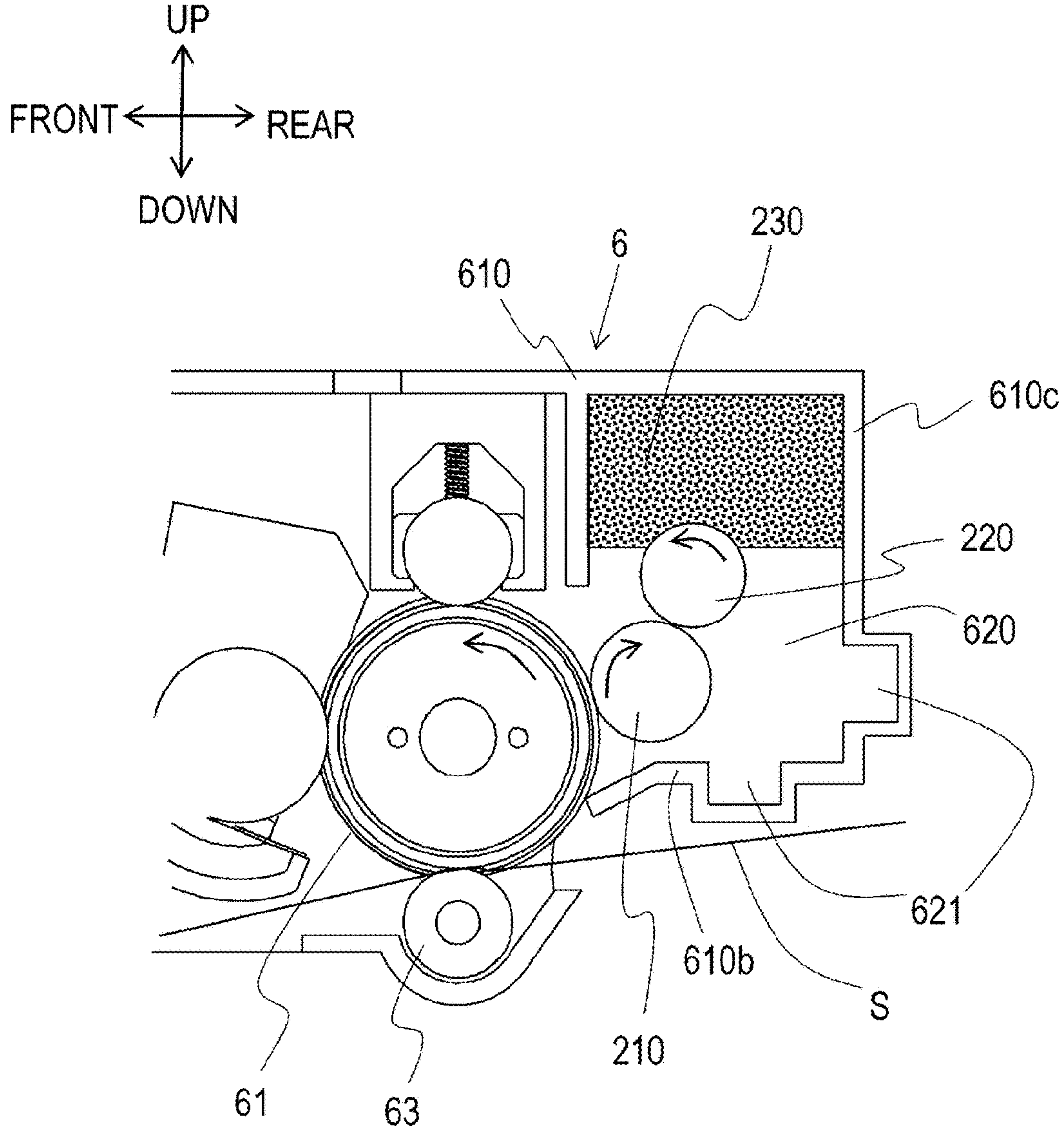
FIG. 22 is a sectional view showing a foreign substance collecting portion and the foreign substance collecting depressed portion according to the first embodiment.

FIG. 18 is a sectional view of a state where a cleaning unit 200 has been mounted to the photosensitive unit 6. FIGS. 19 and 20 are diagrams showing sizes of respective portions in a left-right direction of a cleaning unit 200 according to another mode of which details differ from those of the cleaning unit shown in FIG. 18. FIGS. 21A and 21B are sectional views showing another mode of a foreign substance collecting depressed portion 242. FIG. 22 is a sectional view of the frame 610 being provided with a foreign substance collecting portion 620 and a foreign substance collecting depressed portion 621.

As shown in FIG. 18, the photosensitive unit 6 includes the photosensitive drum 61 and the cleaning unit 200 to the rear in the front-back direction of the frame 610 that supports the photosensitive drum 61. In addition, the cleaning unit 200 includes a cleaning roller 210 as an example of a first roller, a collecting roller 220 as an example of a second roller, a scraping member 230, a case 240, and the like. Furthermore, the cleaning unit 200 is attached to a unit holding portion 610*a* which is attachably and detachably mounted to the frame 610 of the photosensitive unit 6 and which is enclosed by a bottom wall 610*b* on a lower side in the up-down direction and a side wall 610*c* on a rear side in the front-back direction of the frame 610. It should be noted that the cleaning unit 200 may be configured to be attachable to and detachable from the apparatus main body 2.

The cleaning roller 210 and the collecting roller 220 are arranged so that respective rotational axes are approximately parallel to the rotational axis of the photosensitive drum 61.

The cleaning roller 210 is arranged so as to oppose the photosensitive drum 61 between the transfer roller 63 and the charging roller 62 in a rotation direction of the photosensitive drum 61. In addition, the cleaning roller 210 comes into contact with a peripheral surface of the photosensitive drum 61 and rotates at a contact point between the photosensitive drum 61 and the cleaning roller 210 so that a rotation direction of the photosensitive drum 61 and a rotation direction of the cleaning roller 210 become a forward direction. It should be noted that the cleaning roller 210 may be configured to rotate by being driven by the photosensitive drum 61 or configured to rotate by being imparted with a rotative force by a gear or the like.

The collecting roller 220 is arranged so as to oppose to the cleaning roller 210. In addition, the collecting roller 220 comes into contact with a peripheral surface of the cleaning roller 210 and rotates at a contact point between the cleaning roller 210 and the collecting roller 220 so that a rotation direction of the cleaning roller 210 and a rotation direction of the collecting roller 220 become a forward direction. It should be noted that the collecting roller 220 may be configured to rotate by being driven by the cleaning roller 210 or configured to rotate by being imparted with a rotative force by a gear or the like.

The scraping member 230 is formed by a material such as foam and is arranged so as to come into slidable contact with a peripheral surface of the collecting roller 220. In order to improve rubbing performance, a member such as a sheet that is made of a different material may be bonded to a surface of the scraping member 230 on a side that comes into contact with the collecting roller 220. The case 240 houses the cleaning roller 210 and the collecting roller 220. In addition, the case 240 has a foreign substance collecting portion 241 on at least a lower side of the collecting roller 220 in the up-down direction and a rear side of the collecting roller 220 in the front-back direction.

Next, removal of toner remaining on the photosensitive drum 61 after the toner image on the photosensitive drum 61 has been transferred onto the paper sheet S and foreign substances such as paper dust having adhered to the surface of the photosensitive drum 61 from the paper sheet S will be described. According to the configuration described above, the developing roller 71 is biased toward the photosensitive drum 61 and, in this state, the photosensitive drum 61 and the developing roller 71 are in contact with each other. Accordingly, untransferred toner remaining on the photosensitive drum 61 is collected by the developing roller 71 and returned once again to the developing unit 7.

On the other hand, many of the foreign substances such as paper dust having moved to the surface of the photosensitive drum 61 from the paper sheet S in the transfer process are charged to a same polarity as transfer voltage that is applied to the transfer roller 63. Therefore, by applying voltage of a reverse polarity to the cleaning roller 210, the foreign substances are electrostatically moved from the photosensitive drum 61 to the cleaning roller 210. The foreign substances held by the cleaning roller 210 are collected by the collecting roller 220. Voltage which has a same polarity as the voltage applied to the cleaning roller 210 and which is larger in terms of absolute values is applied to the collecting roller 220. Accordingly, the foreign substances on the cleaning roller 210 are electrostatically moved to a surface of the collecting roller 220. The foreign substances collected on the surface of the collecting roller 220 are physically scraped off by the scraping member 230 in contact with the collecting roller 220. The foreign substances scraped off by the scraping member 230 are stored in the foreign substance collecting portion 241.

At this point, a rotative force is imparted to the cleaning roller 210 by a gear or the like to provide a velocity difference between the surface of the cleaning roller 210 and the surface of the photosensitive drum 61. It should be noted that a peripheral velocity of the cleaning roller 210 may be set higher or set lower than a peripheral velocity of the photosensitive drum 61. In addition, at a contact point between the photosensitive drum 61 and the cleaning roller 210, the cleaning roller 210 may be rotated so that a rotation direction of the cleaning roller 210 becomes a reverse direction with respect to a rotation direction of the photosensitive drum 61. According to these configurations, performance of scraping off foreign substances adhered to the photosensitive drum 61 with the cleaning roller 210 can be improved as compared to a case where the cleaning roller 210 is driven by the photosensitive drum 61.

Next, a dimensional relationship among respective parts in the left-right direction will be described with reference to FIG. 19. The cleaning roller 210 is provided in the size (or width (the same applies hereinafter)) of the paper sheet S, in a same size (or length (the same applies hereinafter)) of a region (a maximum paper-passing width SL) across which the paper sheet S may come into contact with the photosensitive drum 61 during passage of paper, or in a larger (or longer (the same applies hereinafter)) size than these sizes in consideration of dimensional differences of parts and the like. In addition, the collecting roller 220 is provided in a same size as the cleaning roller 210 or in a larger size than the cleaning roller 210 in consideration of dimensional differences of parts and the like.

In addition, the scraping member 230 is provided in a same size as the collecting roller 220 or in a larger size than the collecting roller 220 in consideration of dimensional differences of parts and the like. Alternatively, the scraping member 230 may be provided in at least a same size as the cleaning roller 210 or in a larger size than the cleaning roller 210 in consideration of dimensional differences of parts and the like.

Furthermore, the foreign substance collecting portion 241 is provided in a same size as the scraping member 230 or in a larger size than the scraping member 230 in consideration of dimensional differences of parts and the like. Alternatively, the foreign substance collecting portion 241 may be provided in at least a same size as the cleaning roller 210 or in a larger size than the cleaning roller 210 in consideration of dimensional differences of parts and the like.

Next, the foreign substance collecting portion 241 will be described in detail with reference to FIG. 18. As described earlier, the foreign substance collecting portion 241 is provided on at least the lower side of the collecting roller 220 in the up-down direction and the rear side of the collecting roller 220 in the front-back direction. In the case 240, a bottom surface that forms a collection space of the foreign substance collecting portion 241 on a bottom wall intersecting a line L1 drawn downward in the up-down direction from a rotational center of the collecting roller 220 will be defined as a first inner bottom surface 240*a*. In addition, in the case 240, a side surface that forms the collection space of the foreign substance collecting portion 241 on a side wall intersecting a line L2 drawn rearward in the front-back direction from the rotational center of the collecting roller 220 will be defined as a first side surface 240*b*.

The foreign substance collecting portion 241 is a space created by coupling the first inner bottom surface 240*a* and the first side surface 240*b* to each other and is formed by a space including the collecting roller 220. The first inner bottom surface 240*a* is on an upper side in the up-down direction than the bottom wall 610*b* on the opposing frame 610, and the first side surface 240*b* is on a front side in the front-back direction than the side wall 610*c* of the opposing frame 610.

In addition, the foreign substance collecting depressed portion 242 is included in a part of the first inner bottom surface 240*a* of the foreign substance collecting portion 241. The foreign substance collecting depressed portion 242 is provided so as to protrude downward in a vertical direction with respect to the first inner bottom surface 240*a*. In addition, a notched portion 610*d* is provided on the bottom wall 610*b*. Furthermore, the foreign substance collecting depressed portion 242 protrudes downward from the first inner bottom surface 240*a* through the notched portion 610*d* in the up-down direction and protrudes downward to a same height as the bottom wall 610*b* or protrudes lower than the bottom wall 610*b* as shown in FIG. 18. Accordingly, a housing capacity for collecting foreign substances can be increased.

Configuring an outer bottom surface 242*a* on a lower side in the up-down direction of the foreign substance collecting depressed portion 242 which constitutes a part of an outer wall surface of the foreign substance collecting portion 241 so as to come into contact with the paper sheet S when the side wall surface is being conveyed enables a convey direction of the paper sheet S to be controlled. Accordingly, a part of the outer wall surface of the foreign substance collecting portion 241 can be utilized as a guiding portion of the paper sheet S that is being conveyed.

As described above, the cleaning unit 200 that constitutes at least a part of the foreign substance collection apparatus according to the first embodiment which is shown in FIG. 18 has: the frame 610 as a frame body; the photosensitive drum 61 as an image bearing member that bears a developer image and which is rotatably supported by the frame 610; the cleaning roller 210 as a first collecting member that collects foreign substances from a surface of the photosensitive drum 61 by rotating in a state of being in contact with the surface of the photosensitive drum 61 and which is rotatably supported by the frame 610; the collecting roller 220 as a second collecting member that further collects, from the cleaning roller 210, foreign substances having been collected by the cleaning roller 210 by rotating in a state of being in contact with a surface of the cleaning roller 210 and which is rotatably supported by the frame 610; and the scraping member 230 which is provided on the frame 610 so as to be capable of rubbing against the collecting roller 220 that is rotating for scraping off foreign substances from the collecting roller 220.

The frame 610 includes the foreign substance collecting portion 241 as a housing portion that forms a housing space for housing foreign substances. The foreign substance collecting portion 241 has, in a posture during use: the first inner bottom surface 240*a* which is positioned below the scraping member 230 in a gravity direction; the outer bottom surface 242*a* as a second inner bottom surface which is positioned further below the first inner bottom surface 240*a*; and a connecting surface 240*c* which intersects the first inner bottom surface 240*a* and the outer bottom surface 242*a* and which connects the first inner bottom surface 240*a* and the outer bottom surface 242*a* with each other.

As described above, in the foreign substance collection apparatus according to the first embodiment, since the foreign substance collecting portion 241 that houses foreign substances such as paper dust has, further below the first inner bottom surface 240*a*, the foreign substance collecting depressed portion 242 that is enclosed by the outer bottom surface 242*a* and the connecting surface 240*c*, an improvement in a housing capability of foreign substances or, in other words, an increase in a foreign substance housing space can be achieved.

In addition, in a posture during use of the photosensitive unit 6, when the cleaning roller 210, the first inner bottom surface 240*a*, and the outer bottom surface 242*a* are projected onto a projection plane in the vertical direction, the cleaning roller 210 is arranged at a position which overlaps with a region of the first inner bottom surface 240*a* but which does not overlap with a region of the outer bottom surface 242*a*. Accordingly, since the foreign substance collecting depressed portion 242 that is enclosed by the outer bottom surface 242*a* and the connecting surface 240*c* can be formed at a position that deviates from below the cleaning roller 210, a space below the cleaning roller 210 can be reduced. As a result, the photosensitive unit 6 can be downsized.

Furthermore, the foreign substance collecting portion 241 includes a partition portion 240*e* which is provided so as to protrude upward in the gravity direction from the first inner bottom surface 240*a* and which partitions the housing space. Accordingly, the partition portion 240*e* acts as a rib and the strength of the case 240 that constitutes the foreign substance collecting portion 241 can be increased. In addition, in a posture during use, when the collecting roller 220 and the partition portion 240*e* are projected onto a projection plane in the vertical direction, the partition portion 240*e* is arranged at a position that overlaps with a region of the collecting roller 220. Accordingly, foreign substances having been scraped off from the collecting roller 220 is less likely to return to the cleaning roller 210 and foreign substances can be housed in an efficient manner.

In the foreign substance collecting portion 241, the outer bottom surface 242*a* is arranged on an opposite side to a side where the photosensitive drum 61 is provided with respect to the partition portion 240*e*. Accordingly, since the outer bottom surface 242*a* is arranged apart from the photosensitive drum 61, an effect of the presence of the outer bottom surface 242*a* on the strength of the frame 610 that rotatably supports the photosensitive drum 61 can be reduced.

Next, modifications of the photosensitive unit 6 and the cleaning unit 200 according to the first embodiment will be described. In the cleaning unit 200 shown in FIGS. 19 and 20, the depressed portion of the foreign substance collecting portion 241 is provided on the side surface instead of the bottom surface (refer to FIGS. 21A and 21B described below).

In the left-right direction shown in FIG. 19, a region where a paper feeding pickup roller 32*a* provided in the paper feeding mechanism 32 is arranged is a region where a large amount of foreign substances such as paper dust may be produced from the paper sheet S due to the paper feeding pickup roller 32*a* and the paper sheet S rubbing against each other. Therefore, in order to collect a larger amount of the foreign substances such as paper dust, preferably, as shown in FIG. 19, the foreign substance collecting depressed portion 242 is provided so as to be longer than a length D3 of the paper feeding pickup roller 32*a* in the left-right direction and to overlap with a region where the paper feeding pickup roller 32*a* is arranged.

In this manner, the apparatus main body 2 to which the foreign substance collection apparatus is mounted includes the paper feeding pickup roller 32*a* as a conveying roller that conveys the paper sheet S on which an image is recorded. In a longitudinal direction of the paper feeding pickup roller 32*a*, a length of the outer bottom surface 242*a* is longer than the length D3 of the conveying roller in a similar manner to the foreign substance collecting depressed portion 242. As described earlier, paper dust that represents an example of a foreign substance is likely to be produced in a contact portion when the paper feeding pickup roller 32*a* conveys the paper sheet S. In consideration thereof, by making the length of the outer bottom surface 242*a* that constitutes a part of the housing space of the foreign substance collecting portion 241 longer than the length D3 of the paper feeding pickup roller 32*a* in the longitudinal direction, paper dust attributable to the paper sheet S that is conveyed by the paper feeding pickup roller 32*a* can be collected in an efficient manner.

In addition, in the left-right direction, a paper width end SE of the paper sheet S is also a region where a large amount of foreign substances such as paper dust may be produced. Therefore, in order to collect a larger amount of the foreign substances such as paper dust, preferably, the foreign substance collecting depressed portion 242 is provided so as to be wider than a maximum paper-passing width (a maximum width of the paper sheet S) SL in the left-right direction and to overlap with a region of the paper width end SE of the paper sheet S. Alternatively, the foreign substance collecting depressed portion 242 is preferably wider in the left-right direction than a minimum width of the paper sheet S that is conveyed by the paper feeding pickup roller 32*a*. Alternatively, both ends of the foreign substance collecting depressed portion 242 in the left-right direction are favorably positioned on outer sides of both ends of the paper feeding pickup roller 32*a*. Accordingly, paper dust attributable to the paper sheet S that is conveyed by the paper feeding pickup roller 32*a* can be collected in an efficient manner. However, making the foreign substance collecting depressed portion 242 wider than the maximum paper-passing width SL in the left-right direction ends up enlarging, for example, the notched portion 610*d* (or a notched portion 610*e*) of the bottom wall 610*b* shown in FIG. 18 (or the side wall 610*c* shown in FIG. 19), thereby creating a concern that the rigidity of the frame 610 may decline.

In consideration thereof, in order to reduce a decline in the rigidity of the frame 610, the foreign substance collecting depressed portion 242 may be provided so as to be narrower than the maximum paper-passing width SL in the left-right direction to make the notched portion 610*d* (the notched portion 610*e*) of the bottom wall 610*b* (the side wall 610*c*) smaller. Alternatively, in order to reduce a decline in the rigidity of the frame 610 and to increase a housing capacity for collecting foreign substances, as shown in FIG. 20, the foreign substance collecting depressed portion 242 may be provided in plurality in the left-right direction so as to make the notched portion 610*e* of the side wall 610*c* smaller.

When providing the foreign substance collecting depressed portion 242 in plurality in the left-right direction, the foreign substance collecting depressed portions 242 are preferably provided at locations where foreign substances such as paper dust are produced in particularly large amounts. In other words, in order to collect a larger amount of the foreign substances such as paper dust, favorably, the foreign substance collecting depressed portions 242 are provided at positions that overlap with the paper feeding pickup roller 32*a* and positions that overlap with the paper width ends SE of the paper sheet S in the left-right direction.

The foreign substance collecting depressed portion 242 may be provided so as to protrude rearward in the front-back direction from the first side surface 240*b* as shown in FIGS. 21A and 21B. In this case, the notched portion 610*e* is provided on the side wall 610*c*. In addition, the foreign substance collecting depressed portion 242 protrudes rearward from the first side surface 240*b* through the notched portion 610*e* in the front-back direction and protrudes rearward to a same position as the side wall 610*c* or protrudes further rearward than the side wall 610*c* as shown in FIGS. 21A and 21B. Since shapes and arrangements in the left-right direction are similar to those described earlier, a description thereof will be omitted.

As described above, the foreign substance collecting portion 241 has, when the front-back direction is a first direction in a posture during use: the first side surface 240*b* is provided in the first direction and is positioned on a side opposite to another side on which the photosensitive drum 61; a second side surface 240*f* which is positioned apart from the scraping member 230 than the first side surface 240*b* in the first direction; and a connecting surface 240*g* which intersects the first side surface 240*b* and the second side surface 240*f* and which connects the first side surface 240*b* and the second side surface 240*f* with each other.

Accordingly, since the foreign substance collecting portion 241 that houses foreign substances such as paper dust has the foreign substance collecting depressed portion 242 that is enclosed by the second side surface 240*f* being positioned further apart from the scraping member 230 than the first side surface 240*b* and the connecting surface 240*g*, an improvement in a housing capability of foreign substances or, in other words, an increase in a foreign substance housing space can be achieved.

It should be noted that the foreign substance collecting depressed portion 242 may be provided on both the first inner bottom surface 240*a* and the first side surface 240*b* (FIG. 21B) or the foreign substance collecting depressed portion 242 may be provided in plurality on each of the first inner bottom surface 240*a* and the first side surface 240*b*. In addition, the plurality of the foreign substance collecting depressed portions 242 may combine to constitute a part of the foreign substance collecting portion 241.

As described above, by providing the foreign substance collecting depressed portions 242 in a part of the foreign substance collecting portion 241, a housing capacity for collecting foreign substances such as paper dust can be increased.

While the present embodiment has been described using a configuration in which the foreign substance collecting depressed portion 242 is arranged by providing the notched portion 610*d* on the bottom wall 610*b* or the notched portion 610*e* on the side wall 610*c*, this configuration is not restrictive. For example, the bottom wall 610*b* of the frame 610 may be arranged on a lower side in the up-down direction within a range in which the bottom wall 610*b* does not affect the paper convey path and the foreign substance collecting depressed portion 242 may be provided above the bottom wall 610*b* of the frame 610 in the up-down direction. In this case, the bottom wall 610*b* of the frame 610 may be configured so as to control the convey direction of the paper sheet S by coming into contact with the paper sheet S when the paper sheet S is being conveyed.

In addition, the side wall 610*c* of the frame 610 may be arranged on a rear side in the front-back direction within a range in which the side wall 610*c* does not interfere with or otherwise affect the apparatus main body 2, and the foreign substance collecting depressed portion 242 may be provided in the front of the side wall 610*c* of the frame 610 in the front-back direction. According to these configurations, since there is no need to provide the notched portion 610*d* on the bottom wall 610*b* or the notched portion 610*e* on the side wall 610*c* as described earlier, a decline in the rigidity of the frame 610 can be reduced.

Furthermore, while the present embodiment has been described using a configuration in which the cleaning unit 200 is attachably and detachably mounted to the frame 610 of the photosensitive unit 6, this configuration is not restrictive. For example, as shown in FIG. 22, the cleaning roller 210, the collecting roller 220, and the scraping member 230 may be mounted to the frame 610 of the photosensitive unit 6 and the foreign substance collecting portion 620 may be formed by the bottom wall 610*b* and the side wall 610*c*. In addition, a configuration may be adopted in which the foreign substance collecting depressed portion 621 is provided on the bottom wall 610*b*, the side wall 610*c*, or both the bottom wall 610*b* and the side wall 610*c*.

In addition, while the present embodiment has been described using a configuration in which the cleaning unit 200 that includes the case 240, the cleaning roller 210, the collecting roller 220, the scraping member 230, and the foreign substance collecting portion 241 is attachably and detachably mounted to the frame 610 of the photosensitive unit 6, this configuration is not restrictive. For example, a configuration may be adopted in which the case 240 including at least only the foreign substance collecting portion 241 is attachable to and detachable from the photosensitive unit 6. In other words, for example, a configuration may be adopted in which the case 240 including the foreign substance collecting portion 241 and the scraping member 230 or the case 240 including the foreign substance collecting portion 241, the collecting roller 220, and the scraping member 230 are attachable to and detachable from the photosensitive unit 6.

Second Embodiment

Figure 23A:
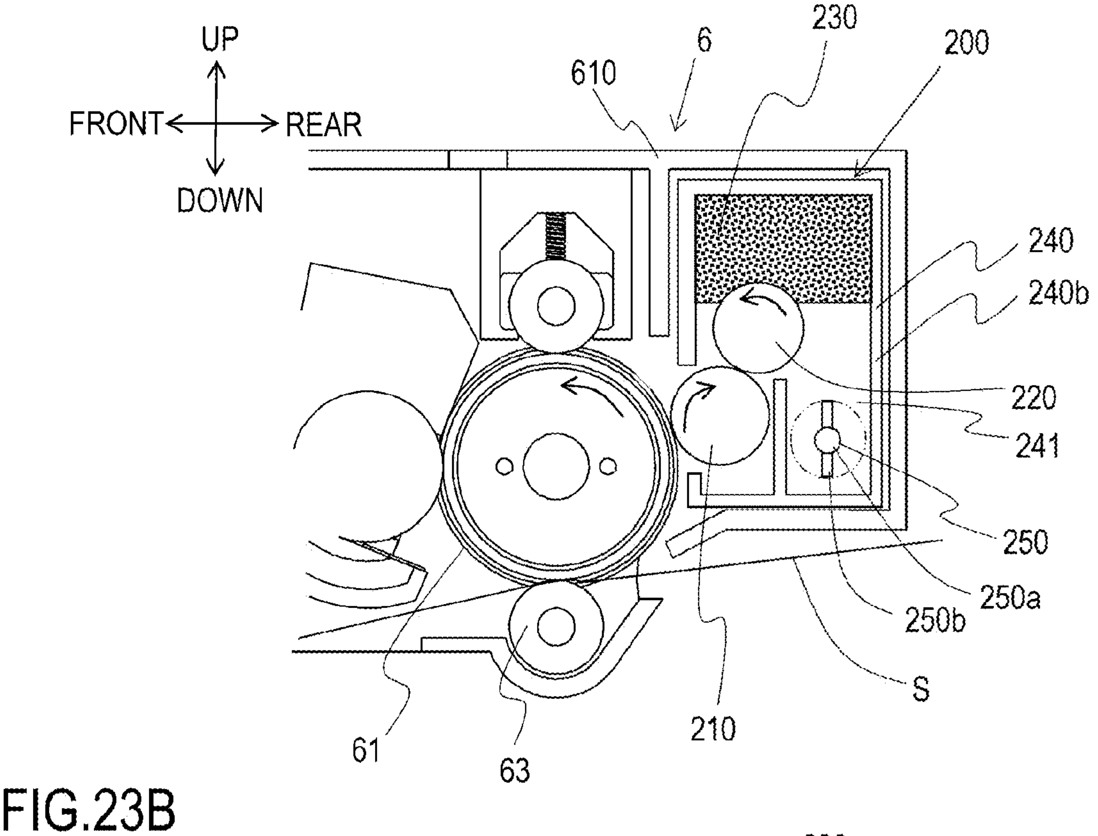
FIGS. 23A and 23B are sectional views of an arrangement of a foreign substance conveying member according to a second embodiment.
Figure 23B:
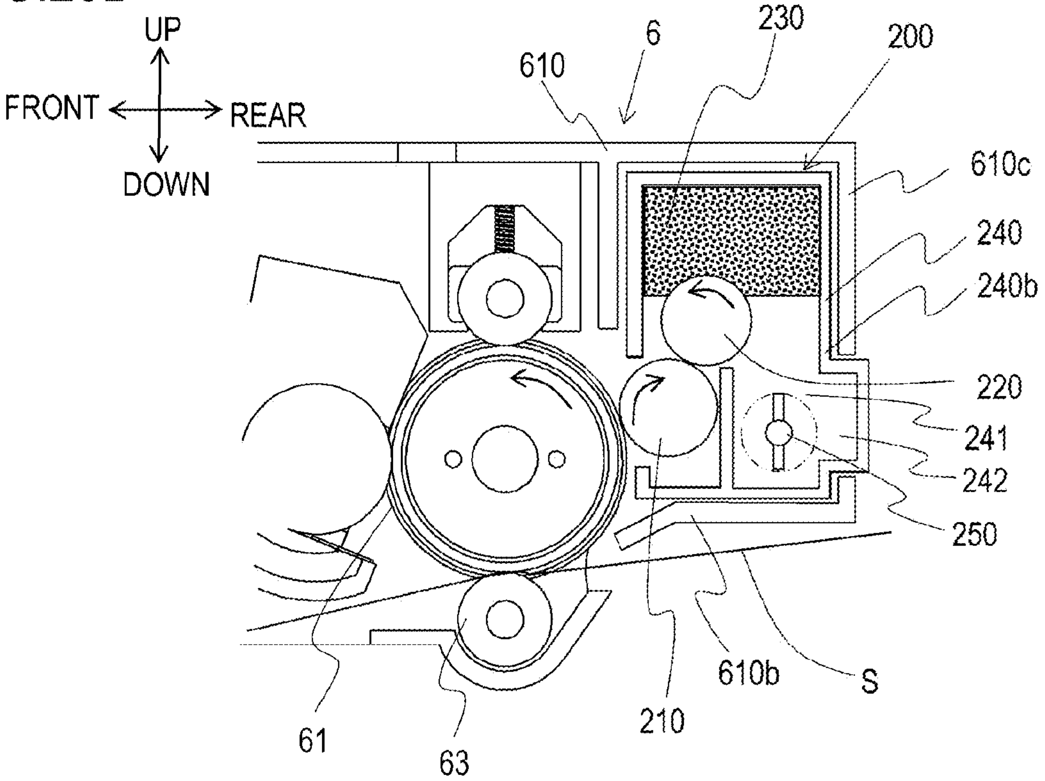

Next, a second embodiment according to the present invention will be described with reference to FIGS. 23A and 23B. In the present embodiment, portions that differ from the embodiment described earlier will be described in detail. Since configurations are similar to those of the embodiment described earlier unless particularly noted to the contrary, such portions will be denoted by the same numerals and a detailed description thereof will be omitted. Other embodiments described hereinafter will be treated in a similar manner. FIGS. 23A and 23B are sectional views of an arrangement of a foreign substance conveying member 250 according to the second embodiment.

As shown in FIG. 23A, the foreign substance conveying member 250 is provided on a lower side of the foreign substance collecting portion 241 in the up-down direction. The foreign substance conveying member 250 is formed by a shaft portion 250*a* and a conveying portion 250*b*, and performs a rotational movement having a rotational axis that extends in the left-right direction due to a driving unit (not illustrated). Alternatively, the foreign substance conveying member 250 may be configured to perform a swinging movement having a rotational axis that extends in the left-right direction. Alternatively, the foreign substance conveying member 250 may be configured to perform a linear reciprocating movement at least in the front-back direction. In other words, as the configuration of the foreign substance conveying member 250, various configurations may be adopted as long as the foreign substance conveying member 250 is capable of acting on foreign substances such as paper dust housed in the foreign substance collecting portion 241 while moving inside the foreign substance collecting portion 241.

The foreign substances such as paper that are scraped by the scraping member 230 are accumulated above the foreign substance collecting portion 241 in the up-down direction when being housed inside the foreign substance collecting portion 241. In consideration thereof, by operating the foreign substance conveying member 250, foreign substances can be moved to the front in the front-back direction with the conveying portion 250*b*. Therefore, an unbiased accumulated state can be formed by leveling the accumulated foreign substances and foreign substances can be housed in the foreign substance collecting portion 241 in an efficient manner.

As shown in FIG. 23B, the foreign substance conveying member 250 may be provided in a configuration in which the foreign substance collecting depressed portion 242 is provided in the foreign substance collecting portion 241. In addition, the conveying portion 250*b* may be integrally formed with the shaft portion 250*a* or may be formed as a separate body. Furthermore, the conveying portion 250*b* may be formed by a material such as a sheet or may be formed in a gridiron-like flat plate shape or a spiral shape.

In addition, in order to house foreign substances such as paper dust in the foreign substance collecting portion 241 in an efficient manner, the conveying portion 250*b* of the foreign substance conveying member 250 may be provided over an entire inside region of the foreign substance collecting portion 241 in the left-right direction. Alternatively, the foreign substance collecting depressed portion 242 may be arranged in the foreign substance collecting portion 241 and, at the same time, the conveying portion 250*b* may be provided at least at a position that opposes the foreign substance collecting depressed portion 242.

As described above, the foreign substance collection apparatus shown in FIGS. 23A and 23B has the foreign substance collecting portion 241 that forms a housing space for housing foreign substances and the foreign substance conveying member 250 that conveys foreign substances inside the housing space. In addition, by providing the foreign substance conveying member 250 below the foreign substance collecting portion 241 in the up-down direction, foreign substances such as paper dust can be housed in the foreign substance collecting portion 241 in an efficient manner and moved inside the housing space. In other words, a housing amount of foreign substances can be increased by utilizing the housing space in an efficient manner. It should be noted that the foreign substance collecting depressed portion 242 shown in FIG. 18 may be provided in a lower part of the foreign substance collecting portion 241 shown in FIGS. 23A and 23B.

Third Embodiment

Figure 24:
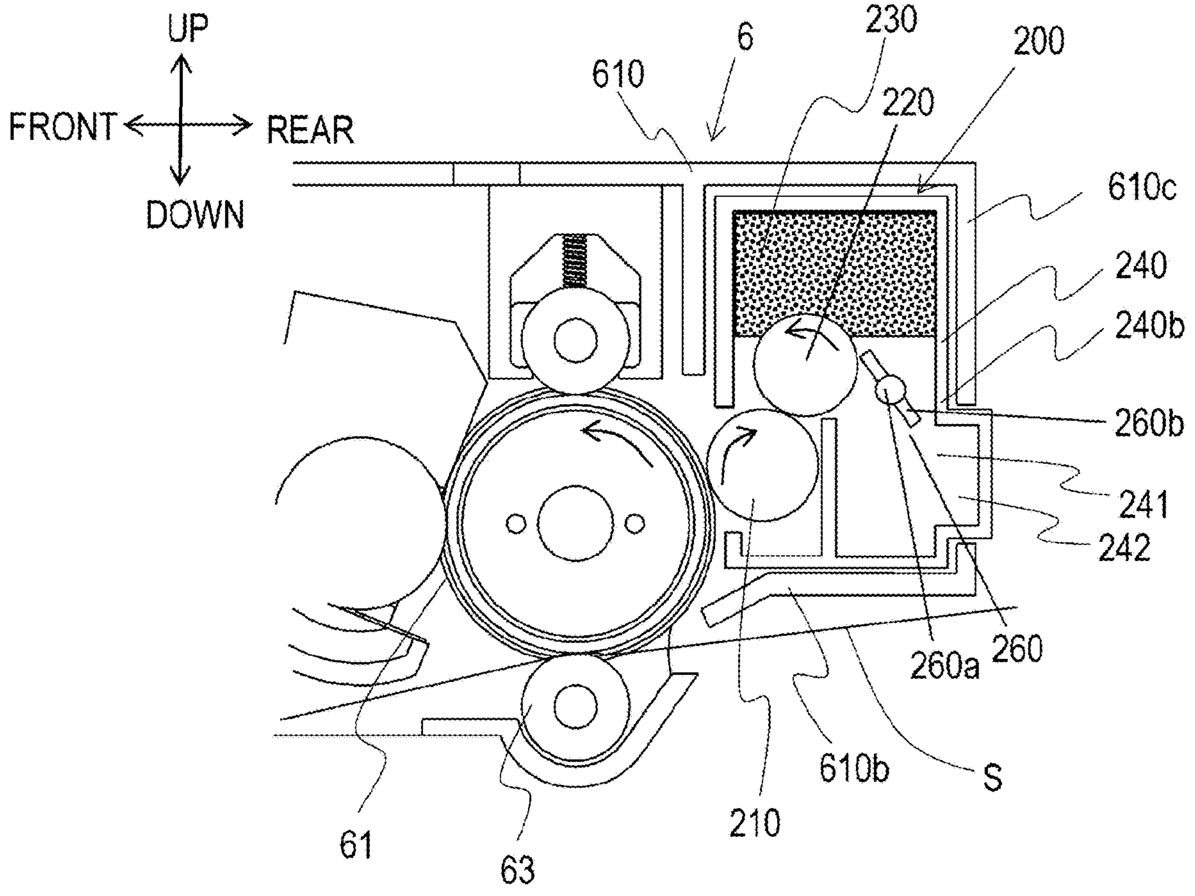
FIG. 24 is a sectional view of an arrangement of a collection conveying sheet according to a third embodiment.

Next, a third embodiment according to the present invention will be described with reference to FIG. 24. FIG. 24 is a sectional view of a rotatable collection conveying sheet 260 in a state where the collection conveying sheet 260 is in contact with the collecting roller 220.

As shown in FIG. 24, the collection conveying sheet 260 (a third collecting member) is provided inside the foreign substance collecting portion 241. The collection conveying sheet 260 is formed by a shaft portion 260*a* and a collection conveying portion 260*b* (a sheet portion), the collection conveying portion 260*b* is constituted by a flexible sheet member, and the collection conveying sheet 260 performs a rotational movement having a rotational axis that extends in the left-right direction due to a driving unit (not illustrated). In addition, a tip of the collection conveying portion 260*b*, which is a free end side of the collection conveying portion 260*b*, is opposite to a fixed end side of the collection conveying portion 260*b* where the collection conveying portion 260*b* is attached to the shaft portion 260*a*. When the collection conveying sheet 260 is rotating, the tip of the collection conveying portion 260*b* comes into contact with the collecting roller 220 when approaching the collecting roller 220 and separates from the collecting roller 220 when receding from the collecting roller 220.

Reasons for bringing the collection conveying sheet 260 into contact with the collecting roller 220 (the second collecting member) while the collection conveying sheet 260 rotates as in the present embodiment are: firstly, to remove foreign substances such as paper dust that remain on the collecting roller 220 and convey the foreign substances to the foreign substance collecting portion 241; secondly, to extend a lifespan of the scraping member 230; and thirdly, to prevent charging polarity of the foreign substances on the collecting roller 220 from becoming reversed. The reasons will be described in detail below.

Since the collecting roller 220 and the scraping member 230 are constantly in contact with each other, in a process cartridge with a long lifespan, the scraping member may wear down and scraping capability of the scraping member may decline. The scraping member 230 wears down because foreign substances with a large size become sandwiched between the collecting roller 220 and the scraping member 230 and the collecting roller 220 rotates in this state for a long time. When the scraping member 230 wears down, foreign substances slip through in a streak-like manner along the rotation direction of the collecting roller 220. Charging polarity of a part of the foreign substances having slipped through in a streak-like manner becomes reversed due to the foreign substances rubbing against each other while being entrained by the collecting roller 220. The foreign substances with reversed charging polarity are electrostatically moved from the collecting roller 220 to the cleaning roller 210 and then moved from the cleaning roller 210 to the photosensitive drum 61 and may cause image defects.

In the present embodiment, by bringing the rotatable collection conveying sheet 260 into contact with the collecting roller 220 during rotation, when the collection conveying sheet 260 comes into contact with the collecting roller 220, large foreign substances on the collecting roller 220 are scraped off by the collection conveying sheet 260 due to a peripheral velocity difference (a relative movement) and are conveyed to the foreign substance collecting portion 241. In addition, since a contact position of the collection conveying sheet 260 with respect to the collecting roller 220 is on an upstream side of a contact position of the scraping member 230 with respect to a rotation direction of the collecting roller 220, the collection conveying sheet 260 is less likely to plunge into the scraping member 230 in a state where large foreign substances are adhered onto the collecting roller 220 and, accordingly, the lifespan of the scraping member 230 can be extended.

Foreign substances that are not scraped off by the collection conveying sheet 260 and remain on the collecting roller 220 are maintained so that charging polarity is not changed due to the collection conveying portion 260*b* of the collection conveying sheet 260 and the foreign substance rubbing against each other. Therefore, a material capable of maintaining the charging polarity of the foreign substances is favorably used for the collection conveying portion 260*b* of the collection conveying sheet 260. While Teflon® or the like can conceivably be selected when desiring to keep the foreign substances positively charged and nylon or the like can conceivably be selected when desiring to keep the foreign substances negatively charged, materials are not limited thereto as long as the charging polarity of the foreign substances can be maintained.

Although an example of a collection conveying sheet 260 having the shaft portion 260*a* and the collection conveying portion 260*b* has been described in the present embodiment, configurations are not limited thereto as long as the functions described earlier can be realized. For example, manifestation of the effect can be expected even with a roller or the like winded with a sponge or a brush in a spiral pattern. In addition, the collection conveying sheet 260 and the collecting roller 220 need not come into uniform contact with each other, and respective rotational axes thereof may or may not be parallel to each other. Furthermore, the rotation direction of the collection conveying sheet 260 with respect to the rotation direction of the collecting roller 220 may be a forward direction or a reverse direction.

In other words, the third collecting member may be configured in any way as long as a state of contact with the second collecting member can be created and a peripheral velocity difference (a relative movement) is generated between contact surfaces at a contact portion. For example, when the respective contact surfaces of the second and third collecting members at the contact portion move in a same direction, controlling a movement speed of the contact surface of the third collecting member to be slower than a movement speed of the contact surface of the second collecting member enables adhered substances to be scraped off from the second collecting member. In addition, by controlling the second and third collecting members so that respective contact surfaces move in different directions at the contact portion, adhered substances can be scraped off from the second collecting member. It should be noted that the third collecting member may come into intermittent contact with the second collecting member or may be in constant contact with the second collecting member.

Fourth Embodiment

Figure 25:
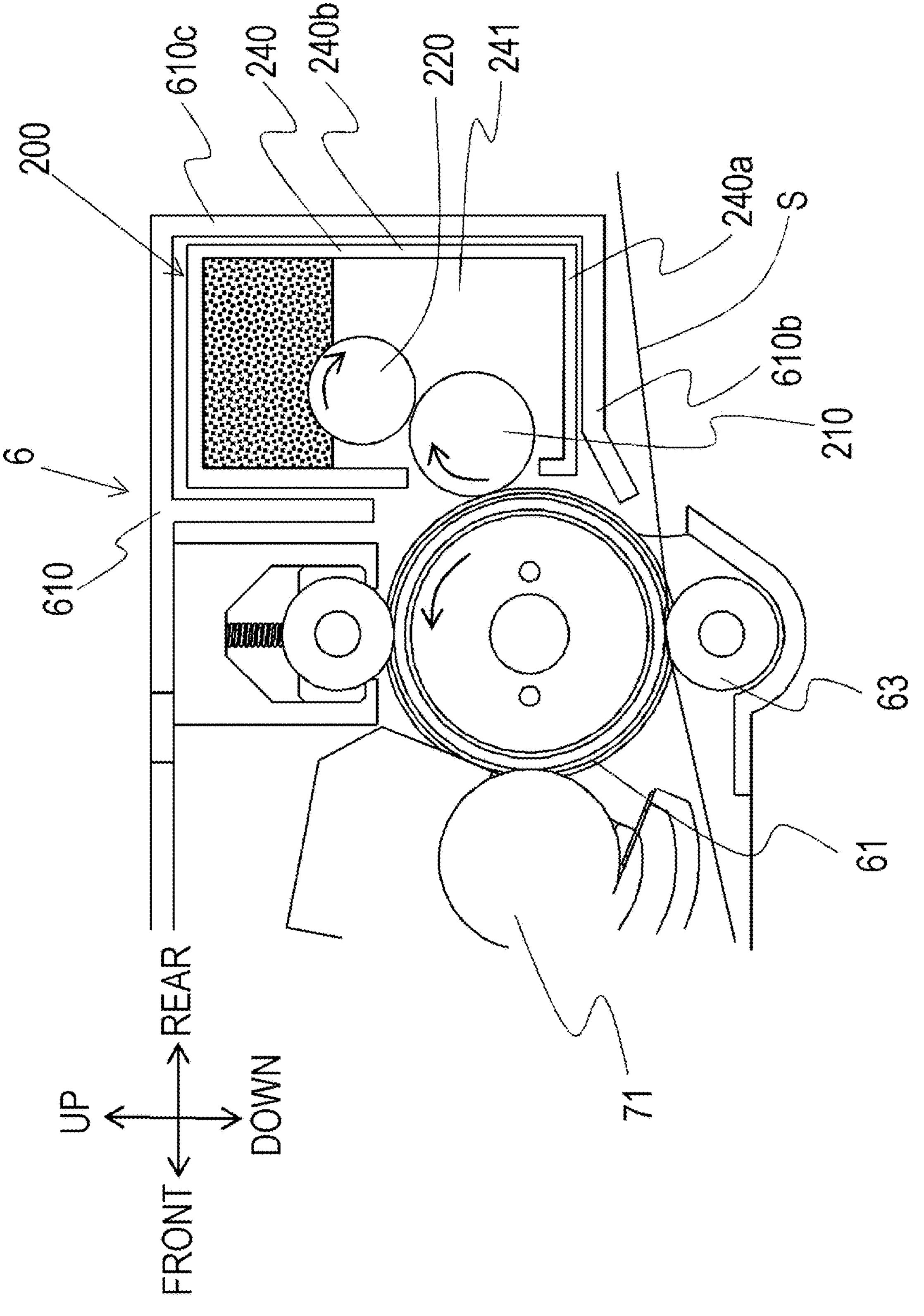
FIG. 25 is a diagram showing rotations of a cleaning roller and a collecting roller according to a fourth embodiment.
Figure 26A:
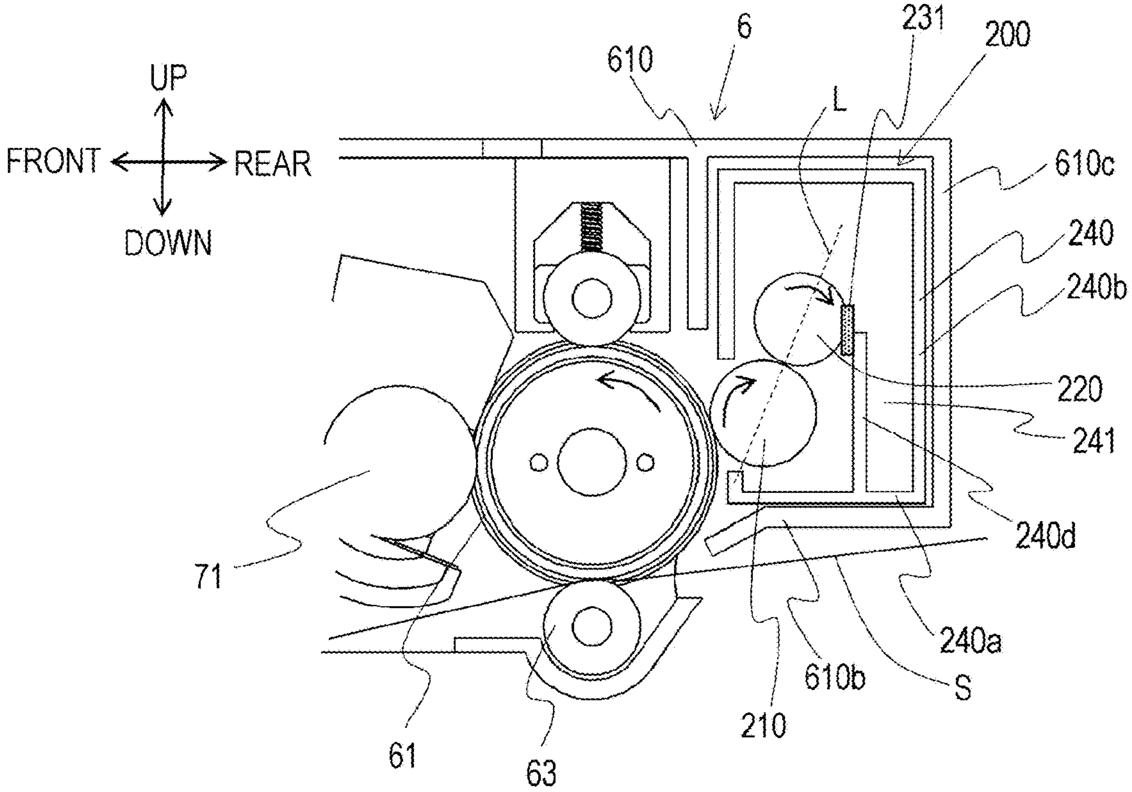
FIGS. 26A and 26B are sectional views showing another mode of a scraping member according to the fourth embodiment.
Figure 26B:
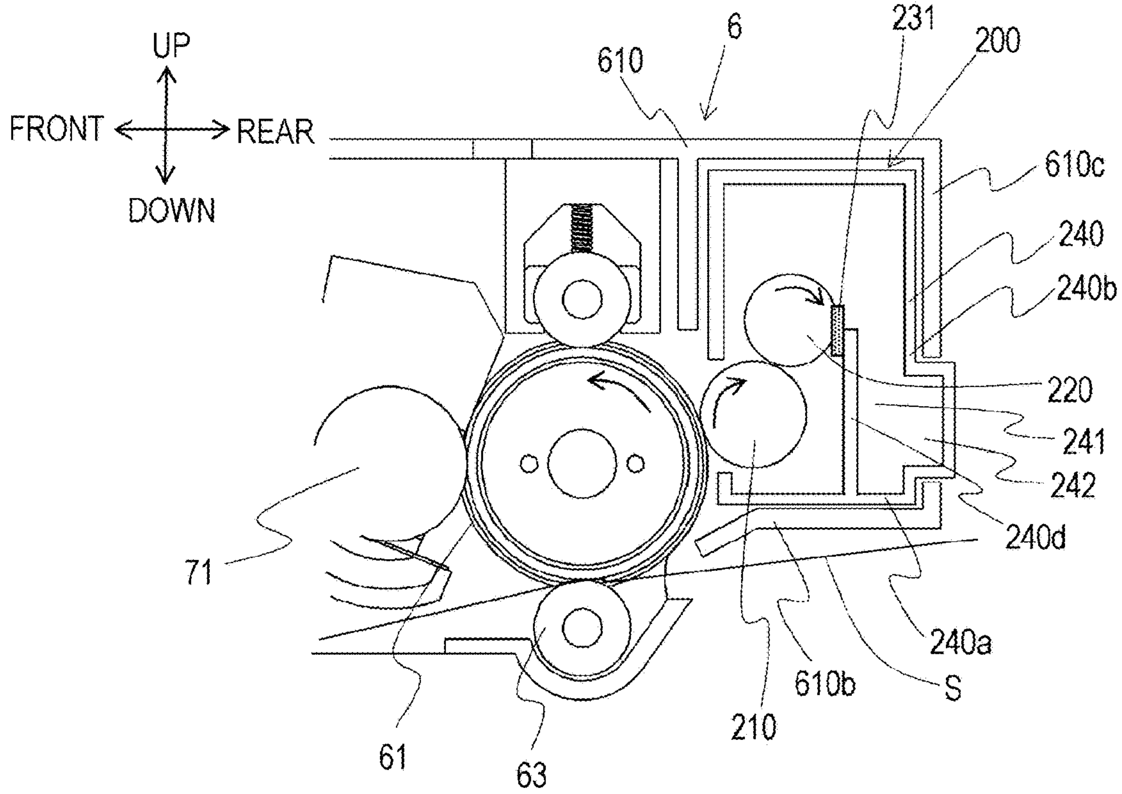

Next, a fourth embodiment according to the present invention will be described with reference to FIGS. 25, 26A and 26B. FIG. 25 is a sectional view showing rotation directions of the cleaning roller 210 and the collecting roller 220. FIGS. 26A and 26B are sectional views showing another mode of a scraping member 231.

As described earlier, due to the collecting roller 220 rotating while in contact with the surface of the cleaning roller 210, foreign substances such as paper dust that are held by the cleaning roller 210 are held by the collecting roller 220. In this case, in order to improve scraping performance with respect to foreign substances adhered to the cleaning roller 210, an area over which the collecting roller 220 comes into contact with the surface of the cleaning roller 210 may be increased.

In addition, a velocity difference may be provided between the surface of the collecting roller 220 and the surface of the cleaning roller 210, and the surface of the cleaning roller 210 and the surface of the collecting roller 220 may be rubbed against each other. This is realized by imparting a rotative force to the cleaning roller 210 and the collecting roller 220 by a gear or the like. Furthermore, as shown in FIG. 25, at the contact point between the cleaning roller 210 and the collecting roller 220, the collecting roller 220 rotates in a rotation direction that is a reverse direction to a rotation direction of the cleaning roller 210.

In other words, at the contact portion where the cleaning roller 210 and the collecting roller 220 come into contact with each other, the cleaning roller 210 and the collecting roller 220 are rotationally driven so that respective surfaces of the cleaning roller 210 and the collecting roller 220 move in reverse directions.

Accordingly, performance of scraping off foreign substances adhered to the cleaning roller 210 can be further improved. Since the collecting roller 220 rotates in a reverse direction with respect to the cleaning roller 210, there is a concern that rotation load torque may rise. In consideration thereof, using a brush roller, a low repulsion sponge, a low resistance sponge, a roller winded with a sponge in a spiral pattern, or the like as the collecting roller 220 enables a rise in rotation load to be suppressed.

Next, a configuration will be described in which foreign substances such as paper dust that are held on the surface of the collecting roller 220 are housed in the foreign substance collecting portion 241 when the collecting roller 220 is rotated so as to move in a reverse direction with respect to the cleaning roller 210 in a contact portion where the cleaning roller 210 and the collecting roller 220 come into contact with each other.

As shown in FIG. 26A, the scraping member 231 is arranged on a downstream side in a rotation direction than a straight line L connecting respective rotational centers of the cleaning roller 210 and the collecting roller 220 in a circumferential direction of the collecting roller 220. The arrangement is intended to prevent foreign substances housed in the foreign substance collecting portion 241 from adhering to the cleaning roller 210 once again. In addition, the scraping member 231 is formed of a foam-forming material and fixed to a holding portion 240*d* of the scraping member 231 which is provided on the case 240.

In other words, when viewed from a rotational axis direction of the collecting roller 220, the scraping member 231 is arranged on an opposite side to a side where the photosensitive drum 61 is present with respect to a virtual straight line L that connects the rotational center of the cleaning roller 210 and the rotational center of the collecting roller 220 with each other. Accordingly, foreign substances having been scraped off by the scraping member 231 are more likely to move towards the opposite side to the side where the photosensitive drum 61 is present.

The scraping member 231 may be a rubber blade or a metal blade. Adopting such a configuration enables foreign substances having been scraped off from the collecting roller 220 to be housed in the foreign substance collecting portion 241 while being prevented from once again adhering to the cleaning roller 210. In addition, as shown in FIG. 26B, the foreign substance collecting depressed portion 242 may be provided in the foreign substance collecting portion 241 and, at the same time, the rotation direction of the collecting roller 220 or the arrangement of the scraping member 231 may be configured as described earlier.

As described above, by causing the collecting roller 220 to rotate in a reverse direction to the cleaning roller 210 or exercising ingenuity in arranging the scraping member 231, foreign substances such as paper dust can be scraped off in an efficient manner from the cleaning roller 210 with the collecting roller 220.

When implementing the present invention, the configurations and arrangements described in the respective embodiments presented above can be appropriately selected and combined with each other as long as no inconsistencies arise.

For example, (1) the foreign substance collecting portion 241 shown in FIG. 18 may be provided with the foreign substance conveying member 250 shown in FIG. 24A or FIG. 24B.

Alternatively, (2) the foreign substance collecting portion 241 shown in FIG. 21A or FIG. 21B may be provided with the foreign substance conveying member 250 shown in FIG. 24A or FIG. 24B.

Alternatively, (3) the foreign substance collecting depressed portion 621 shown in FIG. 22 may be provided with the foreign substance conveying member 250 shown in FIG. 24A or FIG. 24B.

Alternatively, (4) the foreign substance collecting portion 241 shown in FIG. 25 may be provided with the foreign substance conveying member 250 shown in FIG. 24A or FIG. 24B.

Alternatively, (5) the foreign substance collecting portion 241 shown in FIG. 26A or FIG. 26B may be provided with the foreign substance conveying member 250 shown in FIG. 24A or FIG. 24B.

Alternatively, (6) the foreign substance collecting depressed portion 242 shown in FIG. 21A or FIG. 21B may be provided behind the first side surface 240*b* of the foreign substance collecting portion 241 shown in FIG. 25 or FIG. 26A.

Alternatively, the respective configurations of (1) to (6) above may be combined with each other in plurality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-234917, filed on Dec. 25, 2019, and No. 2020-186429, filed on Nov. 9, 2020, which are hereby incorporated by reference herein in its entirety.

What is claimed is:

1. A foreign substance collection apparatus, comprising:
- a frame body that includes an opening;
- an image bearing member rotatably supported by the frame body and configured to bear a developer image;
- a foreign substance collection unit that includes:
- a second frame;
- a first collecting member rotatably supported by the frame body and configured to collect foreign substances from a surface of the image bearing member by rotating while being in contact with the surface of the image bearing member;
- a second collecting member rotatably supported by the frame body and configured to further collect the foreign substances collected by the first collecting member from the first collecting member by rotating while being in contact with a surface of the first collecting member;
- a scraping member provided on the frame body and configured to rub against the second collecting member while the second collecting member is rotating, and to scrape off the foreign substances from the second collecting member; and
- a third collecting member configured to be capable of coming into contact with the second collecting member,
- wherein the third collecting member is configured to be controlled to come into contact with an outer circumferential surface of the second collecting member during a rotation operation in which the second collecting member is rotated,
- wherein the second frame has a protruded portion that protrudes so as to enter the opening; and
- wherein the protruded portion protrudes from inside of the frame body toward outside of the frame body and forms a part of a housing portion.

2. The foreign substance collection apparatus according to claim 1, wherein the third collecting member includes:
- a shaft portion; and
- a sheet portion attached to the shaft portion,
- wherein an outer circumferential surface of the sheet portion is capable of coming into contact with the second collecting member.

3. The foreign substance collection apparatus according to claim 1, wherein the first collecting member and the second collecting member are rotationally driven such that, at a contact portion where the first collecting member and the second collecting member come into contact with each other, respective surfaces of the first collecting member and the second collecting member move in opposite directions.

4. The foreign substance collection apparatus according to claim 3, wherein, when viewed from a rotational axis direction of the second collecting member, the scraping member is arranged on an opposite side from a side where the image bearing member is present with respect to a virtual straight line connecting a rotational center of the first collecting member and a rotational center of the second collecting member.

* * * * *